(12) United States Patent
Gracia-Tinedo et al.

(10) Patent No.: US 12,293,103 B2
(45) Date of Patent: May 6, 2025

(54) METHOD AND SYSTEM FOR ADDRESSING ZONE-AWARENESS IN A HETEROGENEOUS ENVIRONMENT

(71) Applicant: Dell Products L.P., Round Rock, TX (US)

(72) Inventors: Raúl Gracia-Tinedo, Barcelona (ES); Thomas Kaitchuck, Portland, OR (US); Flavio Paiva Junqueira, Barcelona (ES)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 18/482,662

(22) Filed: Oct. 6, 2023

(65) Prior Publication Data
US 2025/0117147 A1   Apr. 10, 2025

(51) Int. Cl.
*G06F 3/06* (2006.01)

(52) U.S. Cl.
CPC .......... *G06F 3/0644* (2013.01); *G06F 3/0614* (2013.01); *G06F 3/067* (2013.01)

(58) Field of Classification Search
CPC ....... G06F 3/0644; G06F 3/0614; G06F 3/067
See application file for complete search history.

(56) References Cited

U.S. PATENT DOCUMENTS

2018/0332367 A1* 11/2018 Kaitchuck ........... G06F 16/2379
2022/0129177 A1*  4/2022 Danilov ................. G06F 3/067

* cited by examiner

*Primary Examiner* — Hosain T Alam
*Assistant Examiner* — Nicholas A. Paperno
(74) *Attorney, Agent, or Firm* — Chamberlain, Hrdlicka, White, Williams & Aughtry; Aly Z. Dossa

(57) ABSTRACT

A first user-initiated data write request including stream data is received from an edge device executing in a first zone. The stream data is partitioned into at least one segment and an event included in the stream data is written into the at least one segment based on an event's routing key. A segment container of a segment store hosts the at least one segment. The stream data is transmitted to a tier-1 storage of the first zone in order to provide a low-latency access to the stream data for the first user. Thereafter, the stream data is moved to a tier-2 storage of a second zone for permanent storage of the stream data. When requested by a second user operating in the second zone, a read-only version of the segment container retrieves the stream data from the tier-2 storage.

20 Claims, 7 Drawing Sheets

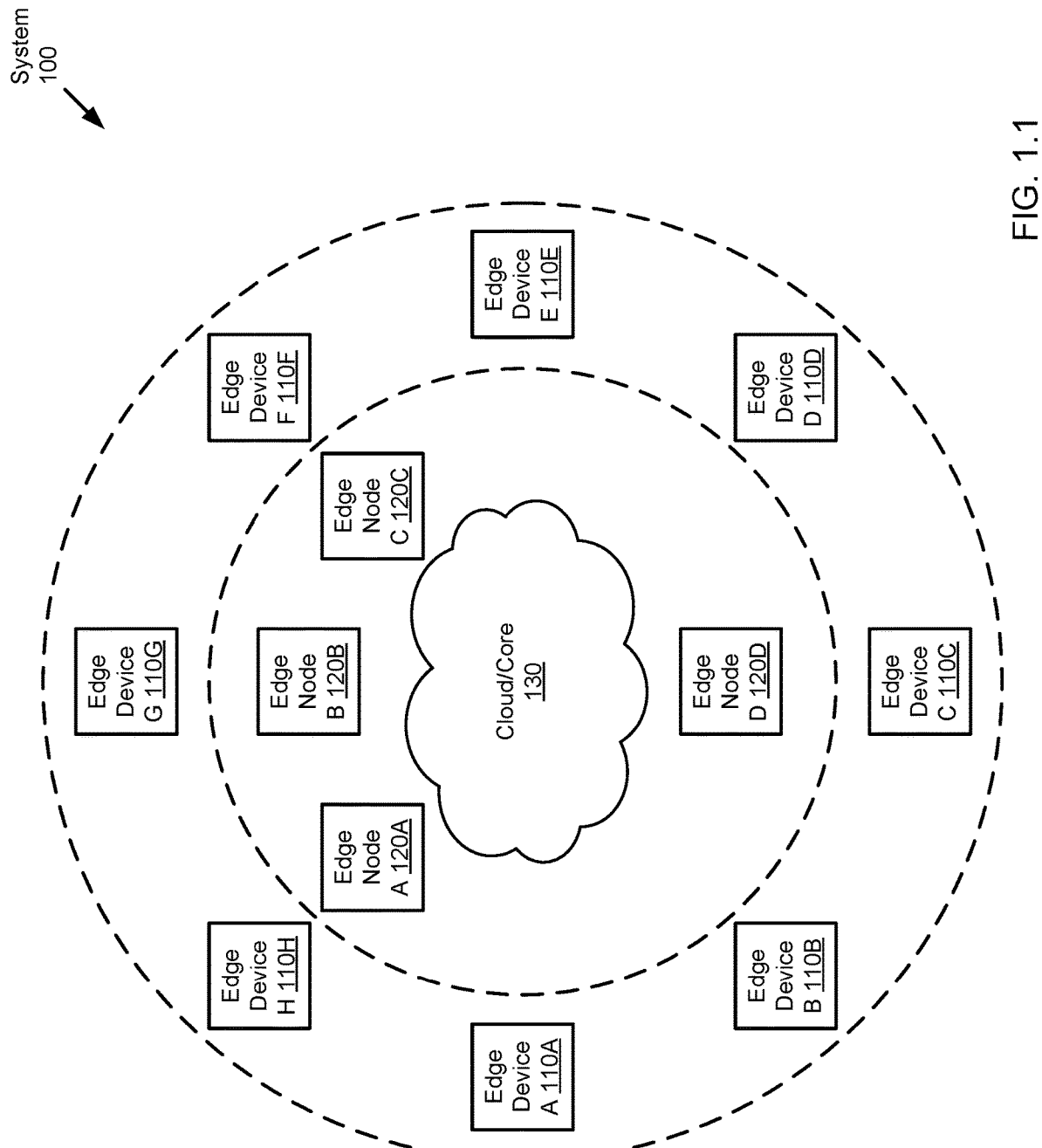
FIG. 1.1

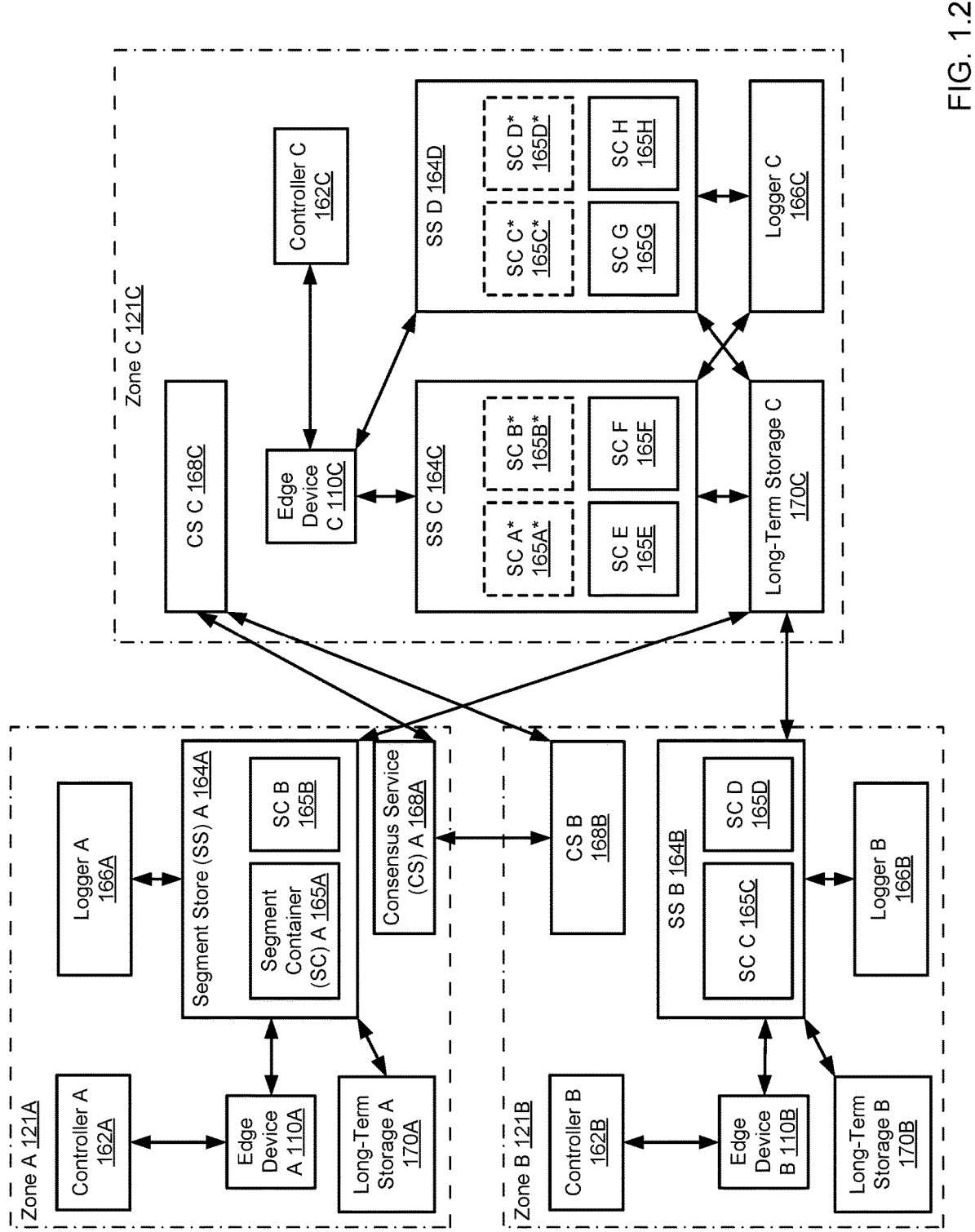
FIG. 1.2

```
system.containers:
    EdgeNodeA: [A - B]
    EdgeNodeB: [C - D]
    Cloud: [E - H]
system.zone: EdgeNodeA
segmentstore:
    instances: 1
    memory: 2GB
    central processing unit (CPU): 2
controller:
    instances:1
    memory: 1GB
    CPU: 1
```

*Configuration Template related to Edge Node A*

```
system.containers:
    EdgeNodeA: [A - B]
    EdgeNodeB: [C - D]
    Cloud: [E - H]
system.zone: EdgeNodeB
segmentstore:
    instances: 1
    memory: 2GB
    CPU: 2
controller:
    instances:1
    memory: 1GB
    CPU: 1
```

*Configuration Template related to Edge Node B*

```
system.containers:
    EdgeNodeA: [A - B]
    EdgeNodeB: [C - D]
    Cloud: [E - H]
        Read-only: [A* - D*]
system.zone: Cloud
segmentstore:
    instances: 1
    memory: 8GB
    CPU: 4
controller:
    instances:1
    memory: 8GB
    CPU: 4
```

*Configuration Template related to Cloud*

FIG. 2.1

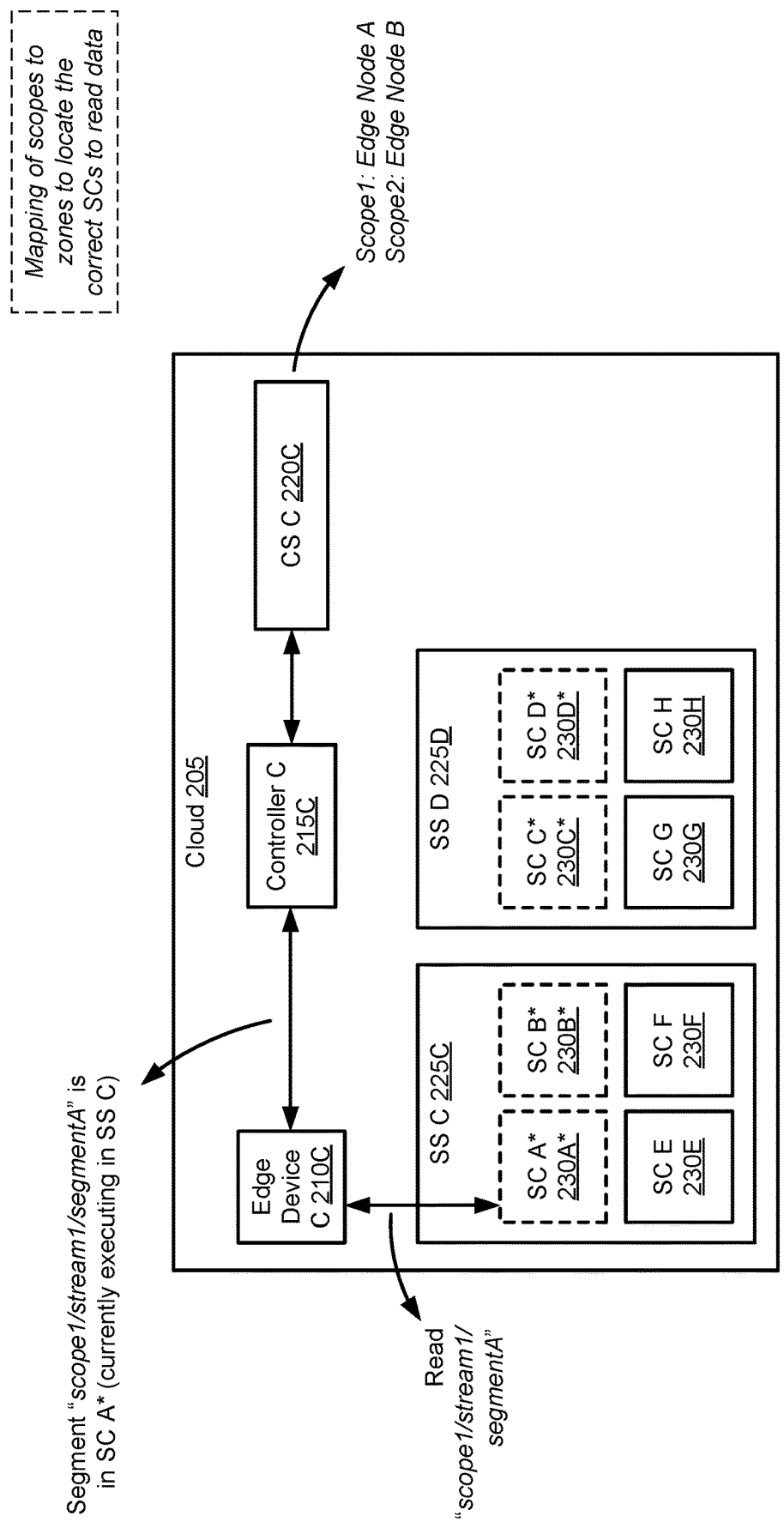
FIG. 2.2

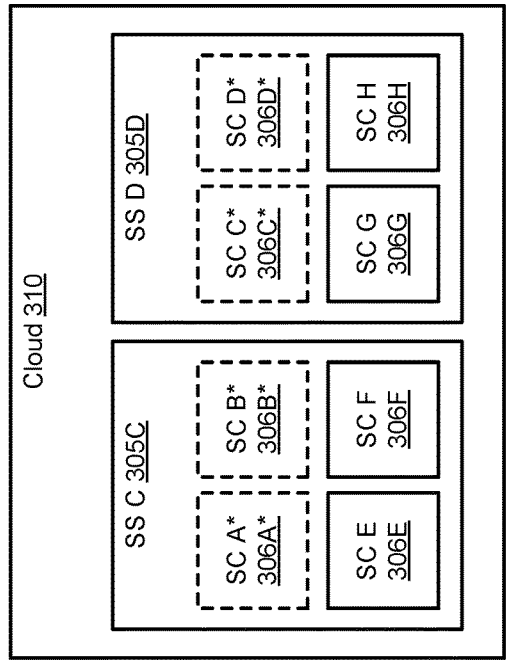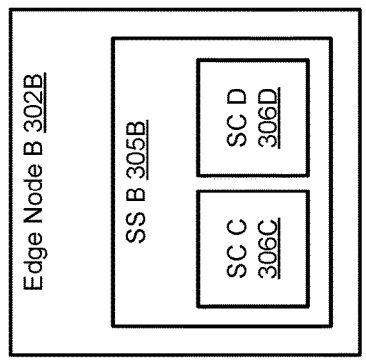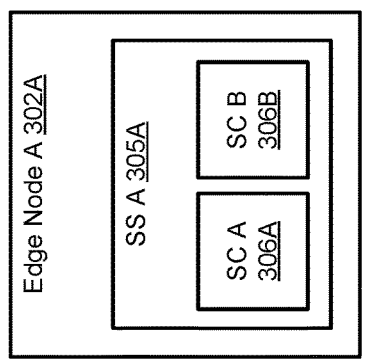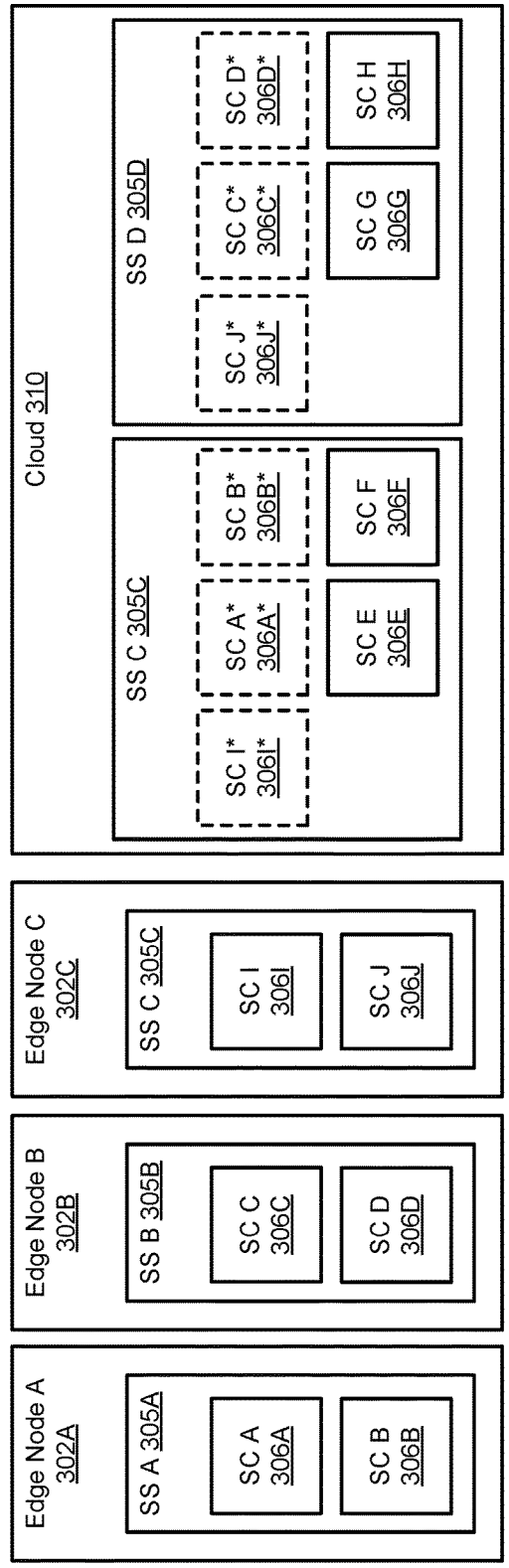
FIG. 3

METHOD AND SYSTEM FOR ADDRESSING ZONE-AWARENESS IN A HETEROGENEOUS ENVIRONMENT

BACKGROUND

Streaming applications are applications that deal with a large amount of data arriving continuously. In processing streaming application data, the data can arrive late, arrive out of order, and the processing can undergo failure conditions. It may be appreciated that tools designed for previous generations of big data applications may not be ideally suited to process and store streaming application data.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.1 shows a diagram of a system in accordance with one or more embodiments of the invention.

FIG. 1.2 shows a diagram of the system in accordance with one or more embodiments of the invention.

FIG. 2.1 shows multiple configuration templates in accordance with one or more embodiments of the invention.

FIG. 2.2 shows a mapping of scopes to zones in accordance with one or more embodiments of the invention.

FIG. 3 shows an extended zone-aware segment container (SC) distribution framework in accordance with one or more embodiments of the invention.

DETAILED DESCRIPTION

Figure 4:
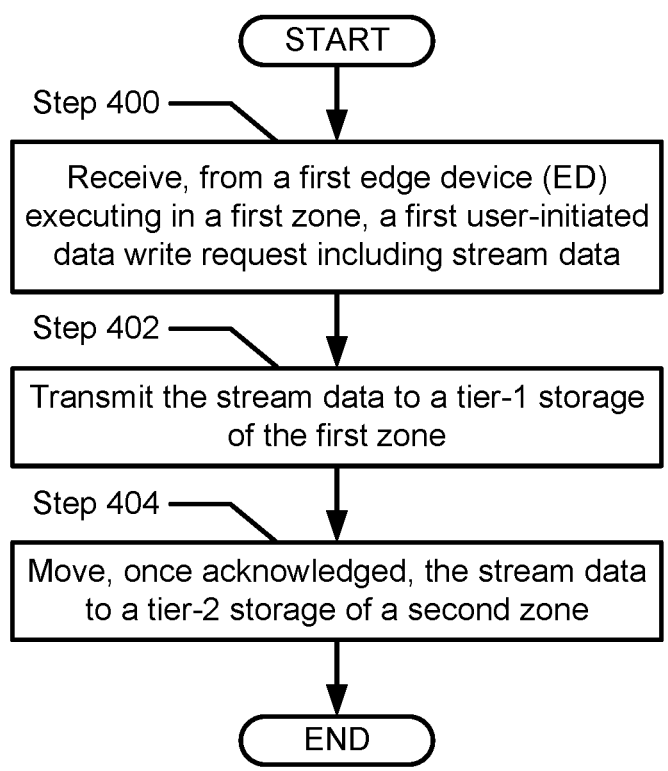
FIG. 4 shows a method for managing stream data in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, streaming data applications process data from sources (e.g., social media networks, online retailer applications, streaming services, financial data applications, Internet of Things (IoT) devices, etc.) that may independently generate data/events at different times. Streaming data applications typically utilize storage systems (e.g., streaming storage systems such as Pravega, an open-source streaming storage engine, Apache Kafka, Apache Pulsar, etc.) because data representing events in a system may be received and stored independent of reading or processing of the data, and further may be written by different writers of the system at different writing rates, as well as read by different readers at different reading rates.

In recent years, streaming storage systems are becoming increasingly popular for managing and storing data events in different scenarios, more specifically in edge environments (e.g., edge computing devices, edge deployments, etc.). These systems allow users to write small events with low-latency and read events both in real-time (e.g., on the order of milliseconds or less) and in batch for processing. In some cases, storage services may need to be stretched across heterogeneous infrastructures within the same organization, for example, to replicate data across multiple clusters/zones. That is, most organizations operate a large, central information technology (IT) facility (e.g., a cloud server, a central server, a core system, etc.) along with edge deployments (e.g., edge nodes, a device network that includes at least two edge computing devices or IoT devices, etc.) close to where data is generated and may need to be processed for the first time (e.g., edge computing generates a processing perimeter at the related IoT network edge where logic and analysis may be performed in real-time before data is exchanged with core systems to (i) reduce traffic sent to and from the corresponding edge devices and (ii) reduce data exchange times in mission critical applications). This is also the case for streaming storage services/systems where, in general, these services are designed to be deployed to one or more zones. However, harnessing edge deployments may require these services to be adaptive and locality-aware, especially when streaming requirements vary across locations (e.g., real-time analytics may be needed at an edge node, whereas high-throughput batch data processing may be required at a cloud server).

Conventionally, Apache Kafka and/or Apache Pulsar have provided different approaches/modes (e.g., the "stretched cluster mode", the "active-active replication mode", the "active-passive replication mode", etc.) to operate across multiple clusters. For example, as part of the stretched cluster mode, broker instances may write data replicas synchronously to brokers in other clusters to ensure durability and consistency. However, one of the drawbacks of this approach is that it may be impractical to perform real-time analytics on streams replicated across distant clusters due to latency penalty (e.g., not providing low write latency). As yet another example, as part of the active-active replication mode, brokers across two clusters may perform bi-directional mirroring of their data. However, this approach may not provide strong write consistency (e.g., two producers may write to the same stream in different clusters) and may incur high-complexity due to the bi-directional mirroring process. As yet another example, in the active-passive replication mode, normally one service (e.g., the MirrorMaker service, the Replicator service, etc.) may move data from an active cluster to a passive cluster or replica one.

Furthermore, streaming storage deployments involving multiple zones may differ for existing systems with respect to correctness properties that they satisfy compared to single-zone deployments depending on how messages are appended (e.g., via a single coordinator or multiple coordinators) and/or replicated (e.g., via mirroring or storage copy), in which such differences make managing "cross-zone" streaming data difficult.

As indicated above, it is not practical to stretch across multiple infrastructures for systems that partition their workloads based on a consistent-hashing approach. For example, a conventional streaming storage service may assume that the service is deployed on a single cluster, so the service distributes a workload across instances (e.g., logical units of partitioning of a workload(s)) based on a "fixed partitioning" approach. As yet another example, in a heterogeneous infrastructure, it is likely that computing resources to be allocated at different locations may vary based on the resources available at the related location and/or the specific requirements of the related location; however, a conventional streaming storage service may not satisfy specific requirements and resource constraints of a specific location (because the service was not aware of the location).

For at least the reasons discussed above and without requiring resource (e.g., time, engineering, etc.) intensive efforts, a fundamentally different approach is needed (e.g., a zone-aware workload partitioning approach (i.e., a zone-aware SC distribution approach/framework) for streaming storage services/systems). The zone-aware workload partitioning approach differs from existing fixed partitioning approach based streaming storage systems, in which (i) it allows users/administrators to decide the number of resources to be placed at different zones (in a heterogeneous infrastructure) while benefiting from an integrated view of data; (ii) it exploits a unique, automatic integrated storage tiering feature; (iii) it introduces one or more read-only SCs that materialize active-passive replication from an edge node to a cloud server; and (iv) it extends a zone-aware SC distribution framework with new zones towards building a mesh of streaming storage system to ingest stream data from various different sources.

Embodiments of the invention relate to methods and systems for managing stream data in a heterogeneous environment. More specifically, the embodiments of the invention may first receive a first user-initiated data write request including stream data from a first edge device executing in a first zone, in which (a) the stream data may be partitioned into at least one segment, (b) an event included in the stream data may be written into at least one segment based on an event's routing key, (c) a first SC of a first segment store (SS) hosts the at least one segment, and (d) the first user operates in the first zone. The stream data may then be transmitted to a tier-1 storage of the first zone in order to provide a low-latency access to the stream data for the first user.

Thereafter, the stream data may be moved to a tier-2 storage of a second zone for permanent storage of the stream data, in which (a) the second zone may include a read-only version of the first SC, (b) using the read-only version of the first SC, a second user operating in the second zone may access the stream data received by the first SS, and (c) when requested by the second user, the read-only version of the first SC may retrieve the stream data from the tier-2 storage.

As a result of the processes discussed below, one or more embodiments disclosed herein advantageously ensure that: (i) a zone-aware SC distribution framework/scheme is provided/established, for example, in systems including edge node deployments; (ii) the zone-aware SC distribution framework is applicable to tiered streaming systems, where the workload (e.g., segment operations across SCs) is partitioned according to a fixed partitioning approach; (iii) the corresponding streaming storage service deployment (e.g., Pravega) is able to stretch across a heterogonous infrastructure efficiently (e.g., stretching across one or more edge nodes and a core unit without involving continuous inter-cluster traffic) to provide a better user/customer experience (which is not possible today); (iv) the corresponding streaming storage service deployment is aware of a location within the heterogonous infrastructure so that the deployment meets specific requirements and resource constraints associated with the location; (v) multiple streaming storage service deployments can be integrated under the same logical set of SCs; (vi) active-passive data replication is enabled with the help of storage tiering capabilities of, for example, Pravega; (vii) persistent data (or event) storage in durable storage is provided to users for a better user experience (e.g., edge node deployments have the ability to store data to a long-term storage (e.g., a tier-2 storage) for executing batch processing/analytics at a later point-in-time); read-only SCs are provided (e.g., by requiring them to be active and manage metadata of segments in a read-only way); (viii) users that want to perform real-time and/or batch processes across different nodes/computing devices are properly served; (ix) an SC extensibility is enabled toward establishing a streaming storage service mesh; (x) read-only SCs enable a better organization of streaming data by grouping segments into containers and coordinating access at the granularity of SCs rather than configuring individual streams; (xi) relying on shared long-term storage avoids any semantic variability compared to mirroring streams directly as all copies of an SC access the same data (e.g., files, objects, etc.) in the shared long-term storage; and/or (xii) administrators not need to invest most of their time and engineering efforts to understand and categorize devices operating on a heterogonous system (e.g., an IoT system) for a better product management and development.

The following describes various embodiments of the invention.

FIG. 1.1 shows a diagram of a system (100) in accordance with one or more embodiments of the invention. The system (100) includes any number of IoT devices or edge devices (e.g., Edge Device A (110A), Edge Device B (110B), etc.), any number of edge nodes (e.g., Edge Node A (120A), Edge Node B (120B), etc.), a cloud/core "subsystem" (130) (or simply "cloud"), and a network (not shown). The system (100) may facilitate the management of "stream" data from any number of sources (e.g., 110A, 110B, etc.). The system (100) may include additional, fewer, and/or different components without departing from the scope of the invention. Each component may be operably connected to any of the other components via any combination of wired and/or wireless connections. Each component illustrated in FIG. 1.1 is discussed below.

In one or more embodiments, the edge devices (e.g., 110A, 110B, etc.), the edge nodes (e.g., 120A, 120B, etc.), the cloud (130), and the network may be (or may include) physical or logical devices, as discussed below.

While FIG. 1.1 shows a specific configuration of the system (100), other configurations may be used without departing from the scope of the invention. For example, although the edge devices (e.g., 110A, 110B, etc.) are shown as a first layer of the system (100), the edge nodes (e.g., 120A, 120B, etc.) are shown as a second layer of the system, and the cloud (130) is shown as a third layer of the system; the system may include another layer (e.g., a fog layer) in between the second layer and third layer. The fog layer may include one or more "fog" devices, similar to that of edge nodes, in which both the edge nodes and fog devices perform distributed computing and focus on the physical deployment of compute and storage resources in relation to data that is being produced (e.g., the difference is a matter of where those resources are located such as edge computing refers to computational processes being done at or near the "edge" of an IoT environment (e.g., 100), whereas fog computing refers to the network connections between the edge nodes and the cloud to extend the cloud closer to the edge of the IoT environment).

Further, functioning of the edge nodes (e.g., 120A, 120B, etc.) and the cloud is not dependent upon the functioning and/or existence of the other components (e.g., devices) in the system (100). Rather, the edge nodes and the cloud may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data) (including multiple events, each of which is associated with a routing key) that are continuously produced by streaming data sources (e.g., writers, clients, the edge devices (e.g., 110A, 110B, etc.), etc.), data chunks, data blocks, atomic data, emails, objects of any type, files of any type (e.g., media files, spreadsheet files, database files, etc.), contacts, directories, sub-directories, volumes, etc.

In one or more embodiments, the system (100) may be a distributed system (e.g., a data processing environment for processing streaming application data) and may deliver at least computing power (e.g., real-time network monitoring, server virtualization, etc.), storage capacity (e.g., data backup), and data protection (e.g., software-defined data protection, disaster recovery, etc.) as a service to users of clients (e.g., the edge devices (e.g., 110A, 110B, etc.)). For example, the system may be configured to organize unbounded, continuously generated data into a stream (described below in reference to FIG. 1.2) that may be auto-scaled based on individual segment loading. The system (100) may also represent a comprehensive middleware layer executing on computing devices (e.g., 500, FIG. 5) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the edge devices (e.g., 110A, 110B, etc.)) and other computations remotely (e.g., away from the users' site using the edge nodes (e.g., 120A, 120B, etc.)) from the users. By doing so, the users may utilize different computing devices that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

In one or more embodiments, an edge device (e.g., 110A, 110B, etc.) may include functionality to, e.g., (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the edge nodes (e.g., 120A, 120B, etc.)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the edge device may perform other functionalities without departing from the scope of the invention.

In one or more embodiments, the edge devices (e.g., 110A, 110B, etc.) may be geographically distributed clients (e.g., user devices, front-end devices, etc.) and may have relatively restricted hardware and/or software resources when compared to the cloud (130). As being, for example, a sensing device, each of the edge devices may be adapted to provide monitoring services. For example, an edge device may monitor the state of a scene (e.g., objects disposed in a scene). The monitoring may be performed by obtaining sensor data from sensors that are adapted to obtain information regarding the scene, in which an edge device may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the invention. For example, the sensor data may be implemented as a tree, a table, a linked list, etc.

In one or more embodiments, the edge devices (e.g., 110A, 110B, etc.) may be physical or logical computing devices configured for hosting one or more workloads, or for providing a computing environment whereon workloads may be implemented. The edge devices may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the edge devices). The edge devices may correspond to computing devices that one or more users use to interact with one or more components of the system (100).

In one or more embodiments, an edge device (e.g., 110A, 110B, etc.) may include any number of applications (and/or content accessible through the applications) that provide computer-implemented application services to a user. Applications may be designed and configured to perform one or more functions instantiated by a user of the edge device. In order to provide application services, each application may host similar or different components. The components may be, for example (but not limited to): instances of databases, instances of email servers, etc. Applications may be executed on one or more edge devices as instances of the application.

Applications may vary in different embodiments, but in certain embodiments, applications may be custom developed or commercial (e.g., off-the-shelf) applications that a user desires to execute in an edge device (e.g., 110A, 110B, etc.). In one or more embodiments, applications may be logical entities executed using computing resources of an edge device. For example, applications may be implemented as computer instructions stored on persistent storage of the edge device that when executed by the processor(s) of the edge device cause the edge device to provide the functionality of the applications described throughout the application.

In one or more embodiments, while performing, for example, one or more operations requested by a user, applications installed on an edge device (e.g., 110A, 110B, etc.) may include functionality to request and use physical and logical resources of the edge device. Applications may also include functionality to use data stored in storage/memory resources of the edge device. The applications may perform other types of functionalities not listed above without departing from the scope of the invention. While providing application services to a user, applications may store data that may be relevant to the user in storage/memory resources of the edge device.

In one or more embodiments, to provide services to the users, the edge devices (e.g., 110A, 110B, etc.) may utilize, rely on, or otherwise cooperate with the edge nodes (e.g., 120A, 120B, etc.). For example, the edge devices may issue requests to the edge nodes to receive responses and interact with various components of the edge nodes. The edge devices may also request data from and/or send data to the edge nodes (for example, the edge devices may transmit information to the edge nodes that allows the edge nodes to perform computations, the results of which are used by the edge devices to provide services to the users). As yet another example, the edge devices may utilize application services provided by the edge nodes. When the edge devices interact with the edge nodes, data that is relevant to the edge devices may be stored (temporarily or permanently) in the edge nodes.

In one or more embodiments, an edge device (e.g., 110A, 110B, etc.) may be capable of, e.g., (i) collecting users' inputs, (ii) correlating collected users' inputs to the computer-implemented services to be provided to the users, (iii) communicating with one or more edge nodes (e.g., 120A, 120B, etc.) that perform computations necessary to provide the computer-implemented services, (iv) using the computations performed by the edge nodes to provide the computer-implemented services in a manner that appears (to the users) to be performed locally to the users, and (v) communicating with any virtual desktop (VD) in a virtual desktop infrastructure (VDI) environment (or a virtualized architecture) provided by the edge nodes (using any known protocol in the art), for example, to exchange remote desktop traffic or any other regular protocol traffic (so that, once authenticated, users may remotely access independent VDs).

As described above, edge devices (e.g., 110A, 110B, etc.) may provide computer-implemented services to users (and/or other computing devices). Edge devices may provide any number and any type of computer-implemented services. To provide computer-implemented services, each edge device may include a collection of physical components (e.g., processing resources, storage/memory resources, networking resources, etc.) configured to perform operations of the edge device and/or otherwise execute a collection of logical components (e.g., virtualization resources) of the edge device.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the edge devices (e.g., 110A, 110B, etc.) provide computer-implemented services to users, the edge devices may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the edge devices (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface an edge device with external entities (e.g., the edge nodes (e.g., 120A, 120B, etc.)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the edge device and the external entities. For example, a networking resource may enable the edge device to be operatively connected, via Ethernet, using a TCP protocol to form a "network fabric", and may enable the communication of data between the edge device and the external entities. In one or more embodiments, each edge device may be given a unique identifier (e.g., an Internet Protocol (IP) address) to be used when utilizing the above-mentioned protocols.

Further, a networking resource, when using a certain protocol or a variant thereof, may support streamlined access to storage/memory media of other edge devices (e.g., 110A, 110B, etc.). For example, when utilizing remote direct memory access (RDMA) to access data on another edge device, it may not be necessary to interact with the logical components of that edge device. Rather, when using RDMA, it may be possible for the networking resource to interact with the physical components of that edge device to retrieve and/or transmit data, thereby avoiding any higher-level processing by the logical components executing on that edge device.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of an edge device (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the edge device that when executed by processing resources of the edge device cause the edge device to provide the functionality of the hypervisor.

In one or more embodiments, an edge device (e.g., 110A, 110B, etc.) may be, for example (but not limited to): a physical computing device, a smartphone, a tablet, a wearable, a gadget, a closed-circuit television (CCTV) camera, a music player, a game controller, etc.

Figure 5:
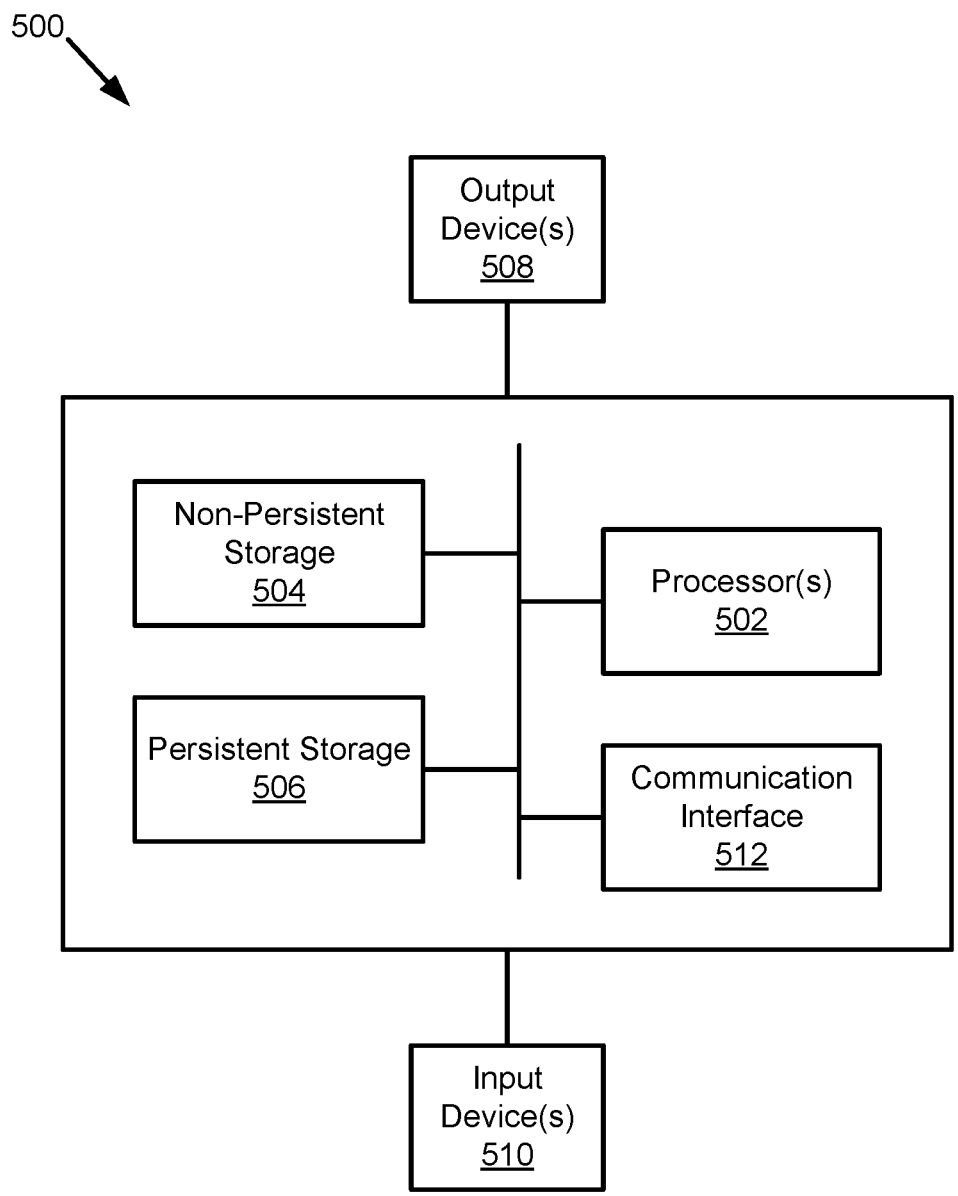
FIG. 5 shows a diagram of a computing device in accordance with one or more embodiments of the invention.

Further, in one or more embodiments, an edge device (e.g., 110A, 110B, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the edge device described throughout the application.

Alternatively, in one or more embodiments, the edge device (e.g., 110A, 110B, etc.) may be implemented as a logical device (e.g., a VM). The logical device may utilize the computing resources of any number of computing devices to provide the functionality of the edge device described throughout this application.

In one or more embodiments, users may interact with (or operate) the edge devices (e.g., 110A, 110B, etc.) in order to perform work-related tasks (e.g., production workloads). In one or more embodiments, the accessibility of users to the edge devices may depend on a regulation set by an administrator of the edge devices. To this end, each user may have a personalized user account that may, for example, grant access to certain data, applications, and computing resources of the edge devices. This may be realized by implementing the virtualization technology. In one or more embodiments, an administrator may be a user with permission (e.g., a user that has root-level access) to make changes on the edge devices that will affect other users of the edge devices. In one or more embodiments, for example, a user may be automatically directed to a login screen of an edge device when the user connected to that edge device. Once the login screen of the edge device is displayed, the user may enter credentials (e.g., username, password, etc.) of the user on the login screen. The login screen may be a graphical user interface (GUI) generated by a visualization module (not shown) of the edge device. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, through the concept of edge computing, some of the computational load may be moved towards to the edge of the network to harness computational capabilities (of the edge nodes (e.g., 120A, 120B, etc.)) that may be untapped in edge nodes, which are located closer (for example, one-hop away from an edge device (e.g., 110A, 110B, etc.)) to users to reduce possible network latency (for example, for mission critical and/or latency-sensitive applications).

In one or more embodiments, an edge node (e.g., 120A, 120B, etc.) may include functionality to, e.g., (i) obtain (or receive) data (e.g., any type and/or quantity of input) from any source (e.g., one or more edge devices) (and, if necessary, aggregate the data); (ii) perform complex analytics and analyze data that is received from one or more edge devices to generate additional data that is derived from the obtained data without experiencing any middleware and hardware limitations; (iii) provide meaningful information (e.g., a response) back to the corresponding edge devices; (iv) filter data (e.g., received from an edge device) before pushing the data (and/or the derived data) to one or more cloud devices (e.g., 130) for management of the data and/or for storage of the data (while pushing the data, the edge node may include information regarding a source of the data (e.g., an identifier of the source) so that such information may be used to associate provided data with one or more of the users (or data owners)); (v) provide power management strategies to prevent overloading of the cloud devices with trivial tasks (e.g., by performing those tasks without significant energy implications); (vi) reduce the response time of the edge devices by minimizing the volume of network traffic to the cloud devices or by distributing traffic in the network; (vii) incorporate strategies (e.g., strategies to provide VDI capabilities) for remotely enhancing capabilities of the edge devices; (viii) provide robust security features to the edge devices and make sure that a minimum level of service is always provided to a user of an edge device; (ix) transmit the result(s) of the computing work performed (e.g., real-time business insights, equipment maintenance predictions, other actionable responses, etc.) to the cloud devices for review and/or other human interactions; (x) reduce latency and the amount of on-cloud computations; (xi) reduce networking costs, especially for wireless cellular connections; (xii) when outlier data appears in data obtained from an edge device, perform an action to provide a real-time response to local events occurred in the edge device (due to its proximity, where no round-trip is needed from the edge device to a cloud device); (xiii) monitor operational states of the edge devices; (xiv) regularly back up configuration information of the edge devices to a cloud device (e.g., long-term storage (e.g., 170, FIG. 1.2)); (xv) in response to a power failure (or a potential power failure), communicate with a second edge node in the system (100) and obtain any zone/location information of the edge node to determine whether the second edge node is available to process data obtained from one or more edge devices; (xvi) provide (e.g., via a broadcast, multicast, or unicast mechanism) information (e.g., a location identifier, the amount of available resources, etc.) associated with the edge node to other edge nodes in the system (100); (xvii) configure or control any mechanism that defines when, how, and what data to provide to the cloud devices and/or fog devices; (xviii) enable the edge devices to communicate with other computing devices in the system (100); and/or (xix) manage operations of one or more edge devices (e.g., receiving information from the edge devices regarding changes in the operation of the edge devices) to improve their operations (e.g., improve the quality of data being generated, decrease the computing resources cost of generating data, etc.).

In one or more embodiments, in order to provide the above-mentioned functionalities, an edge node (e.g., 120A, 120B, etc.) may need to communicate with other components of the system (100) with minimum amount of latency (e.g., with high-throughput (e.g., a high data transfer rate) and sub-millisecond latency). For this reason, representational state transfer application programming interfaces (REST APIs) may be used to enable communication(s) between the edge node and the other components.

In one or more embodiments, to be able to communicate with the cloud (130) (e.g., an IoT hub), an edge node (e.g., 120A, 120B, etc.) and/or an edge device (e.g., 110A, 110B, etc.) may register to the IoT hub. For example, to be able to register/connect to the IoT hub, the edge node may make an API call to the IoT hub. Based on receiving an API call from the edge node, the IoT hub may send a connection string (which has a predetermined length) to the edge node. The edge node may then use the connection string to connect to the IoT hub.

In one or more embodiments, the connection string may be a data structure that includes one or more parameters (e.g., location information of a "cloud" server in the cloud (130), authentication information for that server, etc.) required for an entity to connect to the IoT hub (or any component). In one or more embodiments, the corresponding component of the IoT hub may be offline for, for example, a system maintenance to configure and upgrade an operating system (OS). While the corresponding component is offline, the connection between the edge node (e.g., 120A, 120B, etc.) and the corresponding component may be disconnected. When the corresponding component comes back online, the edge node may reconnect to the corresponding component using the same connection string.

In one or more embodiments, an edge node (e.g., 120A, 120B, etc.) may be, for example (but not limited to): a physical computing device, a router, a switch, a network device with routing or switching functionality, a small/macro base station, a small enclosure (with several servers and some storage) installed atop of a wind turbine to collect and process data, etc.

In one or more embodiments, the edge nodes (e.g., 120A, 120B, etc.) may be geographically distributed so that computing may be performed closer to the source of data (e.g., edge devices (e.g., 110A, 110B, etc.) where data is generated) to improve the service that is delivered to a user of an edge device. In one or more embodiments, an edge node (via its collector (not shown) may monitor the operational states of the edge devices. The operational state of an edge device may correspond to the ability of the edge device to perform predetermined functionalities (e.g., obtaining information regarding a scene associated with an edge device).

For example, the monitoring the operational states of the edge devices (e.g., 110A, 110B, etc.) may be used to determine whether it is likely that the monitoring of the scenes by the edge devices results in information regarding the scenes that accurately reflects the states of the scenes (e.g., a damaged edge device may provide inaccurate information regarding a monitored scene). Said another way, by providing monitoring services, an edge node (e.g., 120A, 120B, etc.) may be able to determine whether an edge device is malfunctioning (e.g., the operational state of an edge device may change due to a damage to the edge device, malicious action (e.g., hacking, a physical attack, etc.) by third-parties, etc.). If the edge device is not in the predetermined operational state (e.g., if the edge device is malfunctioning), the edge node may take action to remediate the edge device. Remediating the edge device may result in the edge device being placed in the predetermined operational state which improves the likelihood that monitoring of the scene by the edge device results in the generation of accurate information regarding the scene.

One of ordinary skill will appreciate that an edge node (e.g., 120A, 120B, etc.) may perform other functionalities without departing from the scope of the invention. In one or more embodiments, the edge node may be configured to perform all, or a portion, of the functionalities described in FIG. 4. Additional details of the edge node are described below in reference to FIG. 1.2.

In one or more embodiments, an edge node (e.g., 120A, 120B, etc.) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the edge node described throughout the application.

Alternatively, in one or more embodiments, similar to an edge device (e.g., 110A, 110B, etc.), the edge node may also be implemented as a logical device.

In one or more embodiments, the cloud (130) may represent components of a logical computing environment (e.g., a cloud computing environment) that may be owned and/or operated by a third-party, for example, by a third-party providing cloud services. Cloud computing environments (which may or may not be public) may include storage environments (e.g., 170, FIG. 1.2) that may provide data protection functionality for one or more users. Cloud computing environments may also perform computer-implemented services (e.g., data protection, data processing, etc.), via one or more cloud servers, on behalf of one or more users.

In one or more embodiments, a cloud server (not shown) may include functionality to, e.g., (i) provide/orchestrate software-defined data protection (e.g., centralized data protection; self-service data protection; automated data discovery, protection, management, and recovery; etc.), (ii) provide data deduplication, (iii) empower data owners (e.g., users) to perform self-service data backup and restore operations from their native applications, (iv) ensure compliance and satisfy different types of service level objectives (SLOs), (v) simplify VM image backups of a VM with near-zero impact on the VM, (vi) in conjunction with the edge nodes (e.g., 120A, 120B, etc.), increase resiliency of the system (100) by enabling rapid recovery or cloud disaster recovery from cyber incidents, (vii) provide operational simplicity, agility, and flexibility for physical, virtual, and cloud-native IT environments, (viii) host one or more computing devices and maintain various workloads for providing a computing environment whereon workloads may be implemented (e.g., to provide computer-implemented services), (ix) support an infrastructure that is based on a network of computing and storage resources that enable the delivery of shared applications and data (e.g., the server may exchange sensor data with other components of the system (100) registered in/to a network in order to, for example, participate in a collaborative workload placement; the server may split up a request with another server, coordinating its efforts to complete the request more efficiently than if the server had been responsible for completing the request; etc.), (x) consolidate multiple data process or protection requests (received from, for example, the edge nodes) so that duplicative operations (which may not be useful for restoration purposes) are not generated, (xi) initiate multiple data process or protection operations in parallel (e.g., the server may host multiple operations, in which each of the multiple operations may (a) manage the initiation of a respective operation and (b) operate concurrently to initiate multiple operations), (xii) provide data management and/or operational management services (in conjunction with the edge nodes) to users and/or other entities to enable secure data access and secure data storage, (xiii) manage operations of one or more edge nodes (e.g., receiving information from the edge nodes regarding changes in the operation of the edge nodes) to improve their operations (e.g., improve the quality of data being generated, decrease the cost of generating data, etc.), (xiv) support a highly scalable deployment of compute and storage resources at one or more global locations/zones (where the closest regional cloud devices facility may still be hundreds of miles away from the edge devices), and/or (xv) obtain data from any number of sources (e.g., the edge devices, the edge nodes, etc.) and for management of the data, register the data when stored in storage (e.g., 170, FIG. 1.2).

In one or more embodiments, the cloud server may be a heterogeneous set, including different types of hardware components, software components, and/or different types of OSs. One of ordinary skill will appreciate that the cloud server may perform other functionalities without departing from the scope of the invention.

In one or more embodiments, the cloud server may be capable of providing a range of functionalities/services to users. However, not all of the users may be allowed to receive all of the services. To manage the services provided to the users, a system (e.g., a service manager) in accordance with embodiments of the invention may manage the operation of a network, in which the edge devices (e.g., 110A, 110B, etc.) and the edge nodes (e.g., 120A, 120B, etc.) are operably connected to the server.

Specifically, the service manager (i) may identify services to be provided by the cloud server (for example, based on the number of users using the edge devices) and (ii) may limit communications of the edge devices to receive server-provided services. For example, the priority (e.g., the user access level) of a user may be used to determine how to manage computing resources within the server to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the network.

Further, consider a scenario where a first user is to be treated as a normal user (e.g., a non-privileged user, a user with a user access level/tier of 4/10). In such a scenario, the user level of that user may indicate that certain ports (of the subcomponents of the network corresponding to communication protocols such as TCP, UDP, etc.) are to be opened, other ports are to be blocked/disabled so that (i) certain services are to be provided to the user by the server (e.g., while the components of the server may be capable of providing any number of remote computer-implemented services, they may be limited in providing some of the services over the network) and (ii) network traffic from that user is to be afforded a normal level of quality (e.g., a normal processing rate with a limited communication bandwidth (BW)). By doing so, (i) computer-implemented services provided to the users may be granularly configured without modifying the operation(s) of the edge devices and (ii) the overhead for managing the services of the edge devices may be reduced by not requiring modification of the operation(s) of the edge devices directly.

In contrast, a second user may be determined to be a high priority user (e.g., a privileged user, a user with a user access level of 9/10). In such a case, the user level of that user may indicate that more ports are to be opened than were for the first user so that (i) components of the server may provide more services to the second user and (ii) network traffic from that user is to be afforded a high level of quality (e.g., a higher processing rate than the traffic from the normal user).

In one or more embodiments, all, or a portion, of the components of the system (100) may be operably connected each other and/or other entities via any combination of wired and/or wireless connections. For example, the aforementioned components may be operably connected, at least in part, via a network (or the network environment).

In one or more embodiments, the network may represent a (decentralized or distributed) computing network and/or fabric configured for computing resource and/or messages exchange among registered computing devices (e.g., the edge devices, the edge nodes, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network may enable interactions between, for example, the edge devices and the edge nodes through any number and type of wired and/or wireless network protocols (e.g., TCP, UDP, IPv4, etc.).

The network may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network and its subcomponents may be implemented using hardware, software, or any combination thereof.

Turning now to FIG. 1.2, FIG. 1.2 shows a diagram of the system (100) to demonstrate (i) "zone-aware" distribution of SCs and (ii) how a streaming storage system stretches across a heterogonous infrastructure (e.g., an environment that includes on-premise edge deployments and a central cloud infrastructure) in accordance with one or more embodiments of the invention. For example, (i) Edge Device A (110A) (e.g., a client), Edge Node A (120A), and Long-Term Storage A (170A) may be a part of a business operation region (BOR) (e.g., Zone A (121A), where Zone A corresponds to a geographic region in the world) of an organization, in which Edge Node A may include, at least, Controller A (162A), Logger A (166A), SS A (164A), and Consensus Service A (168A) (e.g., a first streaming storage system is deployed to Edge Node A); (ii) Edge Device B (110B), Edge Node B (120B), and Long-Term Storage B (170B) may be a part of Zone B (121B) of the organization, in which Edge Node B may include, at least, Controller B (162B), Logger B (166B), SS B (164B), and Consensus Service B (168B) (e.g., a second streaming storage system is deployed to Edge Node B); and (iii) Edge Device C (110C) and the cloud (130) may be a part of Zone C (121C) of the organization, in which the cloud may include, at least, Controller C (162C), Logger C (166C), SS C (164C), SS D (164D), Long-Term Storage C (170C), and Consensus Service C (168C).

As indicated, SCs (e.g., 165A, 165C, 165E, etc.) are distributed across different zones, corresponding to three independent and heterogeneous clusters. Further, there are only two common entities/elements across the streaming storage system deployments, which are (i) the consensus service (e.g., a zookeeper service such as Consensus Service A (168A)—Consensus Service C (168C)) that keeps a configuration template associated with the distribution of SCs across the deployments (see FIG. 2.1), and (ii) Long- Term Storage C (170C) (e.g., in order to exploit storage tiering capabilities provided by the streaming storage system to move data from SCs (located at the related SSs) continuously to the cloud (e.g., active-passive data replication), so that data at the edge nodes may be read and utilized at the cloud). Zone A (121A)—Zone C (121C) may include additional, fewer, and/or different components without departing from the scope of the invention. For example, based on the amount of available computing resources, Zone A (121A) may host multiple edge devices, controllers, read-only SCs, and/or SSs executing contemporaneously, e.g., distributed across multiple servers, VMs, or containers, for scalability and fault tolerance. Each component may be operably connected to any of the other component via any combination of wired and/or wireless connections. Each component illustrated in FIG. 1.2 is discussed below.

The embodiment shown in FIG. 1.2 may show a scenario in which there are two edge nodes (e.g., Edge Node A (120A) and Edge Node B (120B)) executing a streaming storage system (e.g., Pravega) each and another streaming storage system (e.g., Pravega) is deployed to the cloud (130), in which (i) one or more SCs are distributed across the available SSs both at the edge nodes and the cloud and (ii) all the streaming storage system deployments are independent from each other (e.g., meaning that each deployment may customize the resource usage of each SS independently, in an isolated manner).

Further, with the help of the "zone-aware SC distribution framework": (i) the number of SCs to be placed at each zone/location may be determined; (ii) "edge node" zones (e.g., Zone A and Zone B) allow users (via edge devices/clients) to ingest data and execute real-time analytics/processing on that data (while guaranteeing data consistency and durability (e.g., once acknowledged, data is never lost)); (iii) the data may be progressively moved to the "cloud" zone (e.g., Zone C) using Long-Term Storage C (170C) so that users (of Zone C) may have access to data written at "edge" SCs (e.g., 165A-165D) via read-only SCs (e.g., **165A\*-165D\***) to perform large-scale batch analytics on the cloud (with more resources); and (iv) users may define clusters that execute a subset of assigned SCs across a heterogonous infrastructure (e.g., consisting of one or more edge zones (e.g., Zone A, Zone B, etc.) and a cloud zone (e.g., Zone C)) so that different subsets of SCs may be executed on independent clusters (which may be customized in terms of instances and resources per-instance) to adapt different kinds of workloads and hardware components.

In one or more embodiments, the streaming storage system (e.g., Pravega) deployed to Zone A (121A) (illustrated by a dash dot line box) may include Controller A (162A) (which represents a "control plane"), SS A (164A) (which represents a "data plane"), Consensus Service A (168A), and Logger A (166A). SS A (164A) may execute/host, at least, SC A (165A) and SC (165B) (as "active" SCs, so they may serve write/read operations), in which an SC is a unit of parallelism in Pravega (or a unit of work of a SS) and is responsible for executing any storage or metadata operations against the segments (described below) allocated in it. Due to the design characteristics of Pravega (e.g., with the help of the integrated storage tiering mechanism of Pravega), SS A (164A) may store data to the cloud (more specifically, to Long-Term Storage C (170C)), in which the tiering storage may be useful to provide instant access to recent stream data. Although not shown, the streaming storage system may include one or more processors, buses, and/or other components without departing form the scope of the invention.

In one or more embodiments, an SC may represent how Pravega partitions a workload (e.g., a logical partition of the workload at the data plane) in order to host segments of streams. Once (automatically) initialized/initiated, an SC may keep executing on its corresponding SS (e.g., a physical component) to perform one or more operations, where, for example, Edge Device A (110A) may not be aware of what the location of an SC in Pravega (e.g., in case Edge Device A wants to generate a new stream with a segment).

In one or more embodiments, depending on the resource capabilities (or resource related parameters) of the corresponding zone (which may be customized over time), an SS (and the SCs hosted by that SS) may provide different functionalities (e.g., providing a better performance). For example, a resource related parameter may include (or specify), for example (but not limited to): a configurable CPU option (e.g., a valid/legitimate virtual CPU count per SS), a configurable network resource option (e.g., allowability of enabling/disabling single-root input/output virtualization (SR-IOV) for specific APIs), a configurable memory option (e.g., maximum and minimum memory per SS), a configurable GPU option (e.g., allowable scheduling policy and/or virtual GPU count combinations), a configurable DPU option (e.g., legitimacy of disabling inter-integrated circuit (I2C) for different SSs), a user type, a network resource related template (e.g., a 10 GB/s BW with 20 ms latency QoS template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a vCPU count per SS (e.g., 2, 4, 8, 16, etc.), a speed select technology configuration (e.g., enabled, disabled, etc.), an SS IOMMU configuration (e.g., enabled, disabled, etc.), a wake on LAN support configuration (e.g., supported/enabled, not supported/disabled, etc.), a reserved memory configuration (e.g., as a percentage of configured memory such as 0-100%), a memory ballooning configuration (e.g., enabled, disabled, etc.), a vGPU count per SS (e.g., 1, 2, 4, 8, etc.), a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU, hypervisor-enabled drivers approach such as virtual shared graphics acceleration (vSGA), etc.), a user profile folder redirection configuration (e.g., a local user profile, a profile redirection, etc.), a number of SCs available to perform an operation (e.g., 0, 10, 20, etc.), etc.

In one or more embodiments, the control plane may include functionality to, e.g., (i) in conjunction with the data plane, generate, alter, and/or delete streams; (ii) retrieve information about streams; and/or (iii) monitor health of a Pravega cluster (described below) by gathering metrics. Further, SS A (164A) may provide an API to read/write data in streams.

In one or more embodiments, a stream (described below) may be partitioned/decomposed into stream segments (or simply "segments"). A stream may have one or more segments (where each segment may be stored in a combination of tier-1 storage and tier-2 storage), in which data/event written into the stream may be written into exactly one of the segments based on the event's routing key (e.g., "writer- .writeEvent (routingkey, message)"). In one or more embodiments, writers (e.g., of Edge Device A (110A)) may use routing keys (e.g., user identifier, timestamp, machine identifier, etc., to determine a target segment for a stream write operation) so that data is grouped together.

A stream with one or more segments may support parallelism of data writes, in which multiple writers (or multiple writer components) writing data to different segments may exploit/involve one or more servers hosted in a Pravega cluster (e.g., one or more servers, Controller A (162A), and SS A (164A) may collectively be referred to as a "Pravega cluster", in which the Pravega cluster may be coordinated to execute Pravega). In one or more embodiments, a consistent hashing scheme may be used to assign incoming events to their associated segments (such that each event is mapped to only one of the segments based on "user-provided" or "event" routing key), in which event routing keys may be hashed to form "key space" and the key space may be divided into a number of partitions, corresponding to the number of segments. Additionally, each segment may be associated with only one instance of SS (e.g., SS A).

In one or more embodiments, from the perspective of a reader component (e.g., Edge Device A (110A) may include a writer component and a reader component), the number of segments may represent the maximum degree of read parallelism possible (e.g., all the events from a set of streams will be read by only one reader in a "reader group (RG)". If a stream has N segments, then an RG with N reader components may consume from the stream in parallel (e.g., for any RG reading a stream, each segment may be assigned to one reader component in that RG). In one or more embodiments, increasing the number of segments may increase the number of readers in an RG to increase the scale of processing the data from that stream, whereas, as the number of segments decreases, the number of readers may be reduced.

In one or more embodiments, a reader component may read from a stream either at the tail of the stream or at any part of the stream's historical data. Unlike log-based systems that use the same kind of storage for tail reads/writes as well as reads to historical data, a tail of a stream may be kept in tier-1 storage, where write operations may be implemented by Logger A (166A) as described herein. In some cases (e.g., when a failure has occurred and the system is being recovered), Logger A may serve read operations.

In one or more embodiments, the streaming storage system (e.g., Pravega) deployed to Zone A (121A) may implement exactly-once semantics (or "exactly once delivery semantics"), which means data is delivered and processed exactly-once (with exact ordering guarantees), despite failures in, for example, Edge Device A (110A), servers, and/or the network. To achieve exactly-once semantics, streams may be durable, ordered, consistent, and/or transactional (e.g., embodiments of the invention may enable durable storage of streaming data with strong consistency, ordering guarantees, and high-performance).

As used herein, "ordering" may mean that data is read by reader components in the order it is written. In one or more embodiments, data may be written along with an application-defined routing key, in which the ordering guarantee may be made in terms of routing keys (e.g., a write order may be preserved by a routing key, which may facilitate write parallelism). For example, two pieces of data with the same routing key may be read by a reader in the order they were written. In one or more embodiments, Pravega (more specifically, SS A (164A)) may enable an ordering guarantee to allow data reads to be replayed (e.g., when applications fail) and the results of replaying the reads (or the read processes) may be the same.

As used herein, "consistency" may mean that reader components read the same ordered view of data for a given routing key, even in the case of a failure (without missing any data/event). In one or more embodiments, Pravega (more specifically, SS A (164A)) may perform idempotent write processes, where rewrites performed as a result of failure recovery may not result in data duplication (e.g., a write process may be performed without suffering from the possibility of data duplication (and storage overhead) on reconnections).

In one or more embodiments, SS A (164A) may automatically (e.g., elastically and independently) scale individual data streams to accommodate changes in a data ingestion rate. SS A may enable shrinking of write latency to milliseconds, and may seamlessly handle high-throughput reads/writes from one or more concurrent edge devices in Zone A (121A), making SS A ideal for IoT and other time-sensitive implementations. For example, consider a scenario where an IoT application receives information from hundreds of devices feeding thousands of data streams. In this scenario, the IoT application processes those streams to derive a business value from all that raw data (e.g., predicting device failures, optimizing service delivery through those devices, tailoring a user's experience when interacting with those devices, etc.). As indicated, building such an application at scale is difficult without having the components be able to scale automatically as the rate of data increases and decreases.

In one or more embodiments, a data stream may be configured to grow the number of segments as more data is written to the stream, and to shrink when data volume drops off. In one or more embodiments, growing and shrinking a stream may be performed based on a stream's SLO (e.g., to match the behavior of data input). For example, SS A (164A) may enable monitoring a rate of data ingest/input to a stream and use the SLO to add or remove segments from the stream. In one or more embodiments, (i) segments may be added by splitting a segment/shard/partition of a stream (e.g., scaling may cause an existing segment, stored at the related data storage thus far, to be split into plural segments; scaling may cause an existing event, stored at the corresponding data storage thus far, to be split into plural events; etc.), (ii) segments may be removed by merging two segments (e.g., scaling may cause multiple existing segments to be merged into a new segment; scaling may cause multiple existing events to be merged into a new event; etc.), and/or (iii) the number of segments may vary over time (e.g., to deal with a potentially large amount of information in a stream). Further, a configuration of a writer component may not change when segments are split or merged, and a reader component may be notified via a stream protocol when segments are split or merged to enable reader parallelism.

In one or more embodiments, Edge Device A (110A) may send metadata requests to Controller A (162A) and may send data requests (e.g., write requests, read requests, create a stream, delete the stream, get the segments, etc.) to SS A (164A). With respect to a "write path" (which is primarily driven by a sequential write performance of Logger A (166A)), the writer component of Edge Device A may first communicate with Controller A to perform a write operation (e.g., appending events/data) and to infer which SS it supposed to connect to. Based on that, the writer component may connect to SS A to start appending data. Thereafter, SS A (more specifically, SCs hosted by SS A) may first write data (synchronously) to Logger A (e.g., the "tier-1 storage" of Pravega, Apache Bookkeeper, a distributed write ahead log, etc.) to achieve data durability (e.g., in the presence of small write operations) and low-latency (e.g., <10 milliseconds) before acknowledging the writer component on every data written (so that data may not be lost as data is saved in protected, persistent/temporary storage before the write operation is acknowledged).

Once acknowledged, in an offline process, SS A may group the data (written to Logger A) into larger chunks and asynchronously move the larger chunks to Long-Term Storage C (170C) (e.g., the "tier-2 storage" of Pravega, pluggable storage, AWS S3, Apache HDFS, Dell Isilon, Dell ECS, object storage, block storage, file system storage, etc.) for high read/write throughput (e.g., to perform batch analytics) (as indicated, Edge Device A may not directly write to tier-2 storage) and for permanent data storage. For example, Edge Device A may send a data request for storing and processing video data from a surgery in real-time (e.g., performing computations (or real-time analytics) on the video data captured by surgery cameras for providing augmented reality capabilities on the video data to help surgeons, where SC A (165A) may be used for this purpose), and eventually, this data may need to be available (or permanently stored) on a larger IT facility that hosts enough storage/memory and compute resources (e.g., on the cloud/datacenter located in Zone C (121C) for executing batch analytics (with the help of SC A* (165A*)) on historical video data to train machine learning (ML) models, where the video data may be asynchronously available in SC A*).

Further, with respect to a "read path" (which is isolated from the write path), the reader component of Edge Device A (110A) may first communicate with Controller A (162A) to perform a read operation and to infer which SS it supposed to connect to (e.g., via its memory cache, SS A (164A) may indicate where it keeps the data such that SS A may serve tail of data from the cache). For example, if the data is not cached (e.g., historical data), SS A may pull data from Long-Term Storage C (170C) so that the reader component performs the read operation (as indicated, SS A may not use Logger A (166A) to serve a read request of the reader component, where the data in Logger A may be used for recovery purposes when necessary).

In one or more embodiments, once data is (and/or will be) provided by Edge Device A (110A) to SS A (164A), users may desire access to the data managed by SS A. To facilitate provisioning of access to the data, SS A may manage one or more data structures (in conjunction with Logger A (166A)), such as block chains, that include information, e.g., (i) related to data ownership, (ii) related to the data that is managed, (iii) related to users (e.g., data owners), and/or (iv) related to how users may access the stored data. In one or more embodiments, by providing data management services and/or operational management services (in conjunction with Logger A) to the users and/or other entities, SS A may enable any number of entities (in Zone A (121A)) to access data. As part of providing the data management services, SS A may provide (in conjunction with Logger A and/or Long-Term Storage C (170C)) a secure method for storing and accessing data. By doing so, access to data in Logger A may be provided securely while facilitating provisioning of access to the data.

The data management services and/or operational management services provided by SS A (164A) (through, for example, its SCs) may include, e.g., (i) obtaining data requests and/or data from Edge Device A (110A) (where, for example, Edge Device A performs a data write operation through a communication channel); (ii) organizing and/or writing/storing the "obtained" data (and metadata regarding the data) to Logger A (166A) to durably store the data; (iii) generating derived data based on the obtained data (e.g., grouping the data into larger chunks by employing a set of linear, non-linear, and/or ML models), (iv) providing/moving the obtained data, derived data, and/or metadata associated with both data to Long-Term Storage C (170C); (v) managing when, how, and/or what data Edge Device A may provide; (vi) temporarily storing the obtained data in its cache for serving that data to reader components; and/or (vii) queueing one or more data requests.

In one or more embodiments, as being part of the tiered storage streaming system (e.g., tier-1 (durable) storage), Logger A (166A) may provide short-term, low-latency data storage/protection while preserving/guaranteeing the durability and consistency of data written to streams. In some embodiments, Logger A may exist/execute within the Pravega cluster. As discussed above, SS A (164A) may enable low-latency, fast, and durable write operations (e.g., data is replicated and persisted to disk before being acknowledged) to return an acknowledgement to a writer component (e.g., of Edge Device A (110A)), and these operations may be optimized (in terms of I/O throughput) with the help of Logger A.

In one or more embodiments, to add further efficiency, write operations to Logger A (166A) may involve data from multiple segments, so the cost of persisting data to disk may be amortized over several write operations. Logger A may persist the most recently written stream data (to make sure reading from the tail of a stream can be performed as fast as possible), and as data in Logger A ages, the data may be moved to Long-Term Storage C (170C) (e.g., a tail of a segment may be stored in tier-1 storage providing low-latency reads/writes, whereas the rest of the segment may be stored in tier-2 storage providing high-throughput read access with near-infinite scale and low-cost). Further, the Pravega cluster may use Logger A as a coordination mechanism for its components, where Logger A may rely on Consensus Service A (168A).

One of ordinary skill will appreciate that Logger A (166A) may perform other functionalities without departing from the scope of the invention. When providing its functionalities, Logger A may perform all, or a portion, of the methods illustrated in FIG. 4. Logger A may be implemented using hardware, software, or any combination thereof.

In one or more embodiments, in case of reads, SC A (165A) may have a "read index" that tracks the data read for the related segments, as well what fraction of that data is stored in cache. If a read process (e.g., initiated upon receiving a read request) requests data for a segment that is not cached, the read index may trigger a read process against Long-Term Storage C (170C) to retrieve that data, storing it in the cache, in order to serve Edge Device A (110A).

As used herein, data may refer to a "stream data (or a "stream")" that is a continuous (or continuously generated), unbounded (in size), append-only (e.g., data in a stream cannot be modified but may be truncated, meaning that segments are indivisible units that form the stream), lightweight (e.g., as a file), and durable sequence of bytes (e.g., a continuous data flow/structure that may include data, metadata, and/or the like; a collection of data records called "events", in which there may not be a limit on how many events can be in a stream or how many total bytes are stored in a stream; etc.) generated (in parallel) by one or more data sources (e.g., 110A, 110B, IoT sensors, etc.). In one or more embodiments, by using append-only log data structures (which are useful for serverless computing frameworks while supporting real-time and historical data access), SS A (164A) may enable rapid ingestion of information into durable storage (e.g., Logger A (166A)) and support a large variety of application use cases (e.g., publish/subscribe messaging, NoSQL databases, event-oriented applications, etc.). Further, a writer component may keep inserting events at one end of a stream and a reader component may keep reading the latest ones from there or for historical reads, the reader component may target specific offsets and keep reading from there.

As used herein, an event may be a collection of bytes within a stream (or a contiguous set of related extents of unbounded, continuously generated data) (e.g., a small number of bytes including a temperature reading from an IoT sensor composed of a timestamp, a metric identifier, and a value; web data associated with a user click on a website; a timestamped readout from one sensor of a sensor array; etc.). Said another way, events (which are atomic) may be appended to segments of a data stream (e.g., a stream of bytes), where segments are the unit of storage of the data stream (e.g., a data stream may be comprised of one or more segments, where (i) each segment may include one or more events (where a segment may not store events directly, the segment may store the append-only sequence of bytes of the events) and (ii) events may be appended to segments by serializing them into bytes, where once written, that sequence of bytes is immutable). In one or more embodiments, events may be stored along a data stream in parallel to one another and/or in succession to one another (where segments may provide parallelism). That is, one or more events may have data occurring in parallel, or having occurred in parallel. Further, one or more events may sequentially follow one or more other events, such as having data that occurs after one or more other events, or has occurred after data from one or more other events.

In one or more embodiments, the number of segments for appending and/or truncating may vary over a respective unit axis of a data stream. It will be appreciated that a data stream may be represented relative to a time axis. That is, data and/or events may be written to and/or appended to a stream continuously, such as in a sequence or in an order. Likewise, such data may be reviewed and/or analyzed by a user in a sequence or in an order (e.g., a data stream may be arranged based upon a predecessor-successor order along the data stream).

Sources of data written, posted, and/or otherwise appended to a stream may include, for example (but not limited to): online shopping applications, social network applications (e.g., producing a stream of user events such as status updates, online transactions, etc.), IoT sensors, video surveillance cameras, drone images, autonomous vehicles, servers (e.g., producing a stream of telemetry information such as CPU utilization, memory utilization, etc.) etc. The data from streams (and thus from the various events appended to the streams) may be consumed, by ingesting, reading, analyzing, and/or otherwise employing in various ways (e.g., by reacting to recent events to analyze historical stream data).

In one or more embodiments, an event may have a routing key, which may be a string that allows Pravega and/or administrators to determine which events are related (and/or which events may be grouped). A routing key may be derived from data, or it may be an artificial string (e.g., a universally unique identifier) or a monotonically increasing number. For example, a routing key may be a timestamp (to group events together by time), or an IoT sensor identifier (to group events by a machine). In one or more embodiments, a routing key may be useful to define precise read/write semantics. For example, (i) events with the same routing key may be consumed in the order they were written and (ii) events with different routing keys sent to a specific reader will always be processed in the same order even if that reader backs up and re-reads them.

As discussed above, Pravega (e.g., an open-source, distributed and tiered streaming storage system providing a cloud-native streaming infrastructure (i) that is formed by controller instances and SS instances, (ii) that eventually stores stream data in long-term storage (e.g., 170C), (iii) that enables auto-scaling of streams (where a degree of parallelism may change dynamically in order to react workload changes) and its connection with serverless computing, and (iv) that supports both a byte stream (allowing data to be access randomly by any byte offset) and an event stream (e.g., a data stream comprised of events) (allowing parallel writes/reads)) may store and manage/serve data streams, in which the "stream" abstraction in Pravega is a first-class primitive for storing continuous and unbounded data. A data stream in Pravega guarantees strong consistency and achieves good performance (with respect to data storage and management), and may be combined with one or more stream processing engines (e.g., Apache Flink) to initiate streaming applications.

In one or more embodiments, Edge Device A (110A) may concurrently have dynamic write/read access to a stream where all other edge devices at Zone A (121A) may be aware of all changes being made to the stream. SS A (164A) may track data that has been written to the stream. Edge Device A may update the stream by sending a request to SS A that includes the update and a total length of the stream that was written at the time of a last read update by Edge Device A. If the total length of the stream received from Edge Device A matches the actual length of the stream maintained by SS A, SS A may update the stream. If not, a failure message may be sent to Edge Device A and Edge Device A may process more reads to the stream before making another attempt to update the stream.

In one or more embodiments, Edge Device A (110A) may provide a client library that may implement an API for the writer and reader components to use (where an application may use the API to read and write data from and to the storage system). The client library may encapsulate a protocol used for a communication between Edge Device A and Pravega (e.g., Controller A (162A), SS A (164A), etc.). As discussed above, (i) a writer component may be an application that generates events/data and writes them into a stream, in which events may be written by appending to the tail (e.g., front) of the stream; (ii) a reader component may be an application that reads events from a stream, in which the reader component may read from any point in the stream (e.g., a reader component may be reading events from a tail of a stream); and (iii) events may be delivered to a reader component as quickly as possible (e.g., events may be delivered to a reader component within tens of milliseconds after they were written).

In one or more embodiments, segments may be illustrated as "Sn" with n being, for example, 1 through 10. A low number n indicates a segment location closer to a stream head and a high number n indicates a segment location closer to a stream tail. In general, a stream head refers to the smallest offsets of events that have no predecessor (e.g., the beginning of a stream, the oldest data, etc.). Such events may have no predecessor because either such events are the first events written to a stream or their predecessors have been truncated. Likewise, a stream tail refers to the highest offsets of events of an open stream that has no successor (e.g., the most recently written events and/or last events, the end of a stream where new events are appended, etc.). In one or more embodiments, a segment may be (i) an "open segment" indicating that a writer component may write data to that segment and a reader component may consume that data at a later point-in-time, and (ii) a "sealed/immutable segment" indicating that the segment is read-only (e.g., which may not be appended).

In one or more embodiments, a reader component may read from earlier parts (or at an arbitrary position) of a stream (referred to as "catch-up reads", where catch-up read data may be cached on demand) and a "position object (or simply a "position")" may represent a point in the stream that the reader component is currently located.

As used herein, a "position" may be used as a recovery mechanism, in which an application (of Edge Device A (110A)) that persist the last position of a "failed" reader component that has successfully processed may use that position to initialize a replacement reader to pick up where the failed reader left off. In this manner, the application may provide exactly-once semantics (e.g., exactly-once event processing) in the case of a reader component failure.

In one or more embodiments, multiple reader components may be organized into one or more RGs, in which an RG may be a named collection of readers that together (e.g., in parallel, simultaneously, etc.) read events from a given stream. Each event published into a stream may be guaranteed to be sent to one reader component within an RG. In one or more embodiments, an RG may be a "composite RG" or a "distributed RG", where the distributed RG may allow a distributed application to read and process data in parallel, such that a massive amount of data may be consumed by a coordinated fleet of reader components in that RG. A reader (or a reader component) in an RG may be assigned zero or more stream segments from which to read (e.g., a segment is assigned to one reader in the RG), in which the number of stream segments may be balanced to which the reader is assigned. For example, the reader may read from two stream segments while another reader in the RG may only read one stream segment.

In one or more embodiments, reader components may be added to an RG, or reader components fail and may be removed from the RG, and a number of segments in a stream may determine the upper bound of "read" parallelism of readers/reader components within the RG. Further, an application (of Edge Device A (110A)) may be made aware of changes in segments (via SS A (164A)). For example, the application may react to changes in the number of segments in a stream (e.g., by adjusting the number of readers in an associated RG) to maintain maximum read parallelism if resources allow.

In one or more embodiments, events may be appended to a stream individually, or may be appended as a stream transaction (no size limit), which is supported by Pravega. As used herein, a "transaction" refers to a group/set of multiple events (e.g., a writer component may batch up a bunch of events in the form of a transaction and commit them as a unit into a stream). For example, when Controller A (162A) invokes committing a transaction (e.g., as a unit into a stream), the group of events included in the transaction may be written (via the writer component) to a stream as a whole (where the transaction may span multiple segments of the stream) or may be abandoned/discarded as a whole (e.g., if a writer component fails). In one or more embodiments, a transaction may be implemented similar to a stream, in which the transaction may be associated with multiple segments and when an event is published into the transaction, (i) the event itself is appended to a segment of the transaction and (ii) the event may not be visible to a reader component until that transaction is committed. Further, an application may continuously produce results of a data processing operation and use the transaction to durably accumulate the results of the operation.

Further, the location-aware SC distribution framework may require each edge node to be aware of each zone (in the system (100)) via its configuration template (see FIG. 2.1). For example, Controller A (162A) may only consider SC A (165A) and SC B (165B) as valid to serve write and/or read requests. Similarly, SS A (164A) may only be allowed to execute SC A (165A) and SC B (165B). To this end, from the perspective of SS instances, each SS operates as an independent infrastructure. However, each streaming storage system (executing one or more SCs independently) may still share two components in common: (i) the consensus service (e.g., Consensus Service A (168A)—Consensus Service C (168C)) and (ii) Long-Term Storage C (170C) (so that data from multiple edge zones is eventually under the same cloud-scale storage).

In one or more embodiments, as being a stateless component, Controller A (162A) may (further) include functionality to, e.g., (i) manage the lifecycle of a stream and/or transactions, in which the lifecycle of the stream includes features such as generation, scaling, modification, truncation, and/or deletion of a stream (in conjunction with SS A (164A)); (ii) manage a retention policy for a stream that specifies how the lifecycle features are implemented (e.g., requiring periodic truncation (described below)); (iii) manage transactions (e.g., generating transactions (e.g., generating transaction segments), committing transactions (e.g., merging transaction segments), aborting transactions (e.g., dropping a transaction segment), etc.); (iv) be dependent on stateful components (e.g., Consensus Service A (168A) (for configuration template/information), Logger A (166A) (for the write ahead log functionalities)); (v) manage (and authenticate) metadata requests (e.g., get information about a segment, get information about a stream, etc.) received from Edge Device A (110A) (e.g., manage stream metadata); (vi) be responsible for distribution/assignment of SCs into one or more SSs in Zone A (e.g., if a new SS (or a new SS instance) is added to the Pravega executing on Zone A, Controller A may perform a reassignment of SCs along all existing SSs to balance/split the workload); (vii) be responsible for making sense of segments; and/or (viii) manage a control plane of Pravega deployed in Zone A.

In one or more embodiments, although data streams are typically unbounded, truncating them may be desirable in practical real-world scenarios to manage the amount of storage space the data of a stream utilizes relative to a stream storage system. This may particularly be the case where storage capacity is limited. Another reason for truncating data streams may be regulatory compliance, which may dictate an amount of time an application retains data.

In one or more embodiments, a stream may dynamically change over time and, thus, metadata of that stream may change over time as well. Metadata of a stream may include (or specify), for example (but not limited to): configuration information of a segment, history of a segment (which may grow over time), one or more scopes, transaction metadata, a logical structure of segments that form a stream, etc. Controller A (162A) may store metadata of streams (which may enable exactly-once semantics) in a table segment, which may include an index (e.g., a B+ tree index) built on segment attributes (e.g., key-value pairs associated to segments). In one or more embodiments, in Zone C (121C), the corresponding "stream metadata" may further include, for example, a size of a data chunk stored in Long-Term Storage C (170C) and an order of data in that data chunk (for reading purposes and/or for batch analytics purposes at a later point-in-time).

One of ordinary skill will appreciate that Controller A (162A) may perform other functionalities without departing from the scope of the invention. When providing its functionalities, Controller A may perform all, or a portion, of the methods illustrated in FIG. 4. Controller A may be implemented using hardware, software, or any combination thereof.

In one or more embodiments, as being a stateless component, SS A (164A) may (further) include functionality to, e.g., (i) manage the lifecycle of segments (where SS A may be unaware of streams but may store segment data); (ii) generate, merge, truncate, and/or delete segments, and serve read/write requests received from Edge Device A (110A); (iii) use both a durable log (e.g., 166A) and long-term storage (e.g., 170A, 170C, etc.) to store data and/or metadata; (iv) append new data to the durable log synchronously before responding to Edge Device A, and write data asynchronously to the long-term storage (which is the primary destination of data); (v) use its cache to serve tail stream reads, to read ahead from the long-term storage, and/or to avoid reading from the durable log when writing to the long-term storage; (vi) monitor the rate of event traffic in each segment individually to identify trends and based on these trends, associate a trend label (described below) with the corresponding segment; (vii) make sure that each segment maps to only one SC (via a hash function) at any given time, in which that SS instance may maintain metadata (e.g., a rate of traffic into the related segment locally, a scaling type, a target rate, etc.); (viii) in response to a segment being identified as being either hot or cold, the hot/cold segment state is communicated to a central scaling coordinator component of Controller A (162A) (in which that component consolidates the individual hot/cold states of multiple segments and calculates a centralized auto-scaling decision for a stream such as by replacing hot segments with multiple new segments and/or replacing multiple cold segments with a consolidated new segment); (ix) be dependent on stateful components (e.g., Consensus Service A (168A) (for configuration template/information), Logger A (166A) (for the write ahead log functionalities)); (x) manage data paths (e.g., a write path, a read path, etc.); (xi) manage (and authenticate) data requests received from Edge Device A; and/or (xii) manage a data plane of Pravega deployed in Zone A (e.g., implement read, write, and other data plane operations).

One of ordinary skill will appreciate that SS A (164A) may perform other functionalities without departing from the scope of the invention. When providing its functionalities, SS A may perform all, or a portion, of the methods illustrated in FIG. 4. SS A may be implemented using hardware, software, or any combination thereof.

In one or more embodiments, a trend label may have one of three values, e.g., "normal", "hot", or "cold". A segment identified as "hot" may be characterized by a traffic trend that is greater than a predetermined target rate of traffic. The target rate may be supplied by a user via predetermined a stream policy (e.g., a stream/scaling policy may be defined on a data stream such that if a segment gets more than the required number of events, it may be divided). A segment identified as "cold" may be characterized by a traffic trend that is less than the target traffic rate. For example, a hot segment may be a candidate for scale-up into two or more new segments (e.g., Segment 2 being split into Segment 4 and Segment 5). As yet another example, a cold segment may be a candidate for scale-down via merger with one or more other cold segments (e.g., Segment 4 and Segment 5 being merged into Segment 6). As yet another example, a normal segment may be a candidate for remaining as a single segment.

In one or more embodiments, the consensus service may be required to have/keep a consistent view/state of a current SC distribution/assignment across the system (100). In some cases, more zones may be added to the location-aware SC distribution framework (see FIG. 3); however, mostly, identifiers of SCs and their assignments may need to be consistent across zones and one way to achieve this is implementing the consensus service. To this end, Consensus Service A (168A) (e.g., Apache Zookeeper) may include functionality to, e.g., (i) communicate with other zookeepers in other zones (e.g., to keep the configuration template related to Edge Node A (120A) (which hosts Pravega for Zone A (121A)) consistent with other configuration templates available in the heterogeneous environment)); (ii) perform one or more coordination tasks (e.g., helping Controller A (162A) for the assignment/distribution of SCs to SS instances, helping a split of workloads across segments, etc.); and/or (iii) store no stream metadata.

One of ordinary skill will appreciate that Consensus Service A (168A) may perform other functionalities without departing from the scope of the invention (see FIG. 2.1). When providing its functionalities, Consensus Service A may perform all, or a portion, of the methods illustrated in FIG. 4. Consensus Service A may be implemented using hardware, software, or any combination thereof.

In one or more embodiments, Edge Device B (110B) may provide less, the same, or more functionalities and/or services comparing to Edge Device A (110A). One of ordinary skill will appreciate that Edge Device B may perform other functionalities without departing from the scope of the invention.

In one or more embodiments, in Zone B (121B) (illustrated by a dash dot line box), Edge Node B (120B) hosts Pravega deployed to Zone B. To this end, (i) Controller B (162B) may provide less, the same, or more functionalities and/or services comparing to Controller A (162A); (ii) Logger B (166B) may provide less, the same, or more functionalities and/or services comparing to Logger A (166A); (iii) Consensus Service B (168B) may provide less, the same, or more functionalities and/or services comparing to Consensus Service A (168A); and (iv) SS B (164B) may provide less, the same, or more functionalities and/or services comparing to SS A (164A), where SS B hosts SC C (165C) and SC D (165D). One of ordinary skill will appreciate that Controller B, Logger B, Consensus Service B, and SS B may perform other functionalities without departing from the scope of the invention.

In one or more embodiments, Pravega deployed to Zone C (121C) (illustrated by a dash dot line box) may include Controller C (162C), SS C (164C), SS D (164D), Consensus Service C (168C), and Logger C (166C). SS C (164C) may execute (optionally) the same SCs (e.g., SC A (165A) and SC B (165B)) as in Zone A (121A), but in read-only mode (e.g., SC A* (165A*) and SC B* (165B*), illustrated by dashed line boxes). SC A* and SC B* may allow users and/or applications to read/access data in the cloud (e.g., in another zone, Zone C) that was generated at Zone A (e.g., data that was written in SC A (165A) and SC B (165B)) and stored in Long-Term Storage C (170C) at the background. For example, SC A* may be initiated in a read-only mode (e.g., not for writing data) to allow reads on data being processed by SC A executing on another zone.

In one or more embodiments, read-only SCs may be useful to perform an active-passive data replication. For example, SC B (165B) and SC D (165D) are writing data at their corresponding zones and at the same time, (i) SS C (164C) executes SC B (165B) in read-only mode (i.e., SC B* (165B*)) and (ii) SS D (164D) executes SC D (165D) in read-only mode (i.e., SC D* (165D*)), where SC B and SC D are still the only ones able to write data in them. By doing this (e.g., by implementing read-only SCs), SS C and SS D may serve batch analytics tasks (e.g., batch reads) of data processing applications in the cloud without needing to contact SCs in the "edge node" zones (e.g., without applications from one zone having to contact streaming storage system/service of other zones) (because just being able to distribute a given set of SCs across a heterogonous infrastructure may not be enough, for example, for a better user experience and for this reason, the data collected at different zones may be utilized for further processing purposes).

Further, the scenario provided in FIG. 1.2 may also utilize inherent capabilities of the corresponding streaming storage system (e.g., Pravega) deployed at each zone to move data to Long-Term Storage (170C) jointly with read-only SCs as a form of active-passive data replication, which is useful for various different edge node analytics workloads. For example, a user may perform real-time analytics at the corresponding edge zone (e.g., Zone A, Zone B, etc.), where data is generated; then, the related "active" SCs (e.g., SC A, SC B, etc.) may move the data progressively to Long-Term Storage C (170C) and the read-only SCs (e.g., SC A*, SC B*, etc.) may read/retrieve such data (from Long-Term Storage C (170C) (without retrieving the data from the corresponding active SCs and without suffering from latency), in which the data is written by the active SCs ingesting it at the edge zone) for serving batch reads/ analytics in the cloud (for example, upon receiving a batch read request from a user). As yet another example, a user may generate a read-only version of an active SC executing on another zone to serve batch reads, in which the read-only SC may periodically synchronize its metadata to be able to serve the most recent data moved to Long-Term Storage C (170C) by the active SC ingesting data (e.g., the active-passive data replication).

In one or more embodiments, Edge Device C (110C) may provide less, the same, or more functionalities and/or services (e.g., performing batch analytics) comparing to Edge Device A (110A). One of ordinary skill will appreciate that Edge Device C may perform other functionalities without departing from the scope of the invention.

In one or more embodiments, in Zone C (121C), Edge Node C (120C) hosts Pravega deployed to Zone C. To this end, (i) Controller C (162C) may provide less, the same, or more functionalities and/or services comparing to Controller A (162A); (ii) Logger C (166C) may provide less, the same, or more functionalities and/or services comparing to Logger A (166A); (iii) Consensus Service C (168C) may provide less, the same, or more functionalities and/or services comparing to Consensus Service A (168A); (iv) SS C (164C) may provide less, the same, or more functionalities and/or services comparing to SS A (164A), where SS C hosts SCE (165E), SC F (165F), SC A* (165A*), and SC B* (165B*); and SS D (164D) may provide less, the same, or more functionalities and/or services comparing to SS A, where SS D hosts SC G (165G), SC H (165H), SC C* (165C*), and SC D* (165D*). One of ordinary skill will appreciate that Controller C, Logger C, Consensus Service C, SS C, and SS D may perform other functionalities without departing from the scope of the invention.

In one or more embodiments, with the help of the zone-aware distribution of SCs (or with the help of the location-aware SC distribution framework), SCs are logically partitioned across different zones towards increasing data management performance and efficiency. More specifically, this framework allows users to split a set of SCs into multiple "fixed partitioning rings" based on a per-zone basis (where (i) the layout of SCs in Pravega may be seen as multiple fixed partitioning rings and (ii) the fixed partitioning SC distribution in Pravega is replaced by the zone-aware distribution framework). As indicated above, for example, SC A (165A) and SC B (165B) are assigned to Zone A (121A), SC C (165C) and SC D (165D) are assigned to Zone B (121B), whereas the rest of the set of SCs (e.g., SC E (165E), SC F (165F), SC G (165G), and SC H (165H)) are deployed to Zone C (121C). To this end, each controller (e.g., Controller A (162A)—Controller C (162C)) considers the SCs within their zone, for example, when it comes to reply metadata queries from clients (e.g., Edge Device A (110A)—Edge Device C (110C)).

As described above, the fixed partitioning SC distribution in Pravega is replaced by the zone-aware distribution framework, in which this replacement includes, at least, a change in SC distribution logic shared across the control and data planes of Pravega, as well as the storage of the new distribution framework in the corresponding consensus service.

In one or more embodiments, as being part of the tiered storage streaming system (e.g., tier-2 storage), Long-Term Storage C (170C) may provide long-term (e.g., near-infinite retention), durable, high read/write throughput (e.g., to perform batch analytics; to perform generate, read, write, and delete operations; erasure coding; etc.) historical stream data storage/protection with near-infinite scale and low-cost. Long-Term Storage C (170C) may be, for example (but not limited to): pluggable storage, AWS S3, Apache HDFS, Dell Isilon, Dell ECS, object storage, block storage, file system storage, etc. In one or more embodiments, Long-Term Storage C (170C) may be located/deployed outside of Pravega deployed to Zone C (121C), in which asynchronous migration of events from tier-1 storage to tier-2 storage (without affecting the performance of tail reads/writes) may reflect different access patterns to stream data.

In one or more embodiments, Long-Term Storage C (170C) may be a fully managed cloud (or local) storage that acts as a shared storage/memory resource that is functional to store unstructured and/or structured data. Further, Long-Term Storage C (170C) may also occupy a portion of a physical storage/memory device or, alternatively, may span across multiple physical storage/memory devices.

In one or more embodiments, Long-Term Storage C (170C) may be implemented using physical devices that provide data storage services (e.g., storing data and providing copies of previously stored data). The devices that provide data storage services may include hardware devices and/or logical devices. For example, Long-Term Storage C (170C) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, Long-Term Storage C (170C) may include a memory device (e.g., a dual in-line memory device), in which data is stored and from which copies of previously stored data are provided. As yet another example, Long-Term Storage C (170C) may include a persistent storage device (e.g., an SSD), in which data is stored and from which copies of previously stored data is provided. As yet another example, Long-Term Storage C (170C) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, Long-Term Storage C (170C) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, Long-Term Storage C (170C) may store/log/record unstructured and/or structured data that may include (or specify), for example (but not limited to): a valid (e.g., a granted) request and its corresponding details, an invalid (e.g., a rejected) request and its corresponding details, historical stream data and its corresponding details, content of received/intercepted data packets/chunks, information regarding a sender (e.g., a malicious user, a high priority trusted user, a low priority trusted user, etc.) of data, information regarding the size of intercepted data packets, a mapping table that shows the mappings between an incoming request/call/network traffic and an outgoing request/call/network traffic, a cumulative history of user activity records obtained over a prolonged period of time, a cumulative history of network traffic logs obtained over a prolonged period of time, previously received malicious data access requests from an invalid user, a backup history documentation of a workload, a model name of a hardware component, a version of an application, a product identifier of an application, an index of an asset (e.g., a file, a folder, a segment, etc.), recently obtained customer/user information (e.g., records, credentials, etc.) of a user, a cumulative history of initiated model training operations (e.g., sessions) over a prolonged period of time, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a cumulative history of initiated data backup operations over a prolonged period of time, a cumulative history of initiated data restore operations over a prolonged period of time, an identifier of a vendor, a profile of an invalid user, a fraud report for an invalid user, one or more outputs of the processes performed by Controller C (162C), power consumption of components of Pravega deployed to Zone C (121C), etc. Based on the aforementioned data, for example, Edge Node C (120C) may perform user analytics to infer profiles of users communicating with components exist in Zone C.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, Long-Term Storage C (170C) may provide an indexing service (e.g., a registration service). That is, data may be indexed or otherwise associated with registration records (e.g., a registration record may be a data structure that includes information (e.g., an identifier associated with data) that enables the recorded data to be accessed). More specifically, an agent of Long-Term Storage C (170C) may receive various data related inputs directly (or indirectly) from Edge Device C (110C). Upon receiving, the agent may analyze those inputs to generate an index(es) for optimizing the performance of Long-Term Storage C (170C) by reducing a required amount of database access(es) when implementing a request (e.g., a data retrieval request). In this manner, requested data may be quickly located and accessed from Long-Term Storage C (170C) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data may be maintained by, for example, Edge Node C (120C). Edge Node C may add, remove, and/or modify those data in Long-Term Storage C (170C) to cause the information included in Long-Term Storage C (170C) to reflect the latest version of, for example, SLAs. The unstructured and/or structured data available in Long-Term Storage C (170C) may be implemented using, for example, lists, tables, unstructured data, structured data, etc. While described as being stored locally, the unstructured and/or structured data may be stored remotely, and may be distributed across any number of devices without departing from the scope of the invention.

While Long-Term Storage C (170C) has been illustrated and described as including a limited number and type of data, Long-Term Storage C (170C) may store additional, less, and/or different data without departing from the scope of the invention. In the embodiments described above, Long-Term Storage C (170C) is demonstrated as part of the cloud (130); however, embodiments herein are not limited as such. In one or more embodiments, Long-Term Storage C (170C) may be a separate entity from the cloud.

One of ordinary skill will appreciate that Long-Term Storage C (170C) may perform other functionalities without departing from the scope of the invention. When providing its functionalities, Long-Term Storage C (170C) may perform all, or a portion, of the methods illustrated in FIG. 4. Long-Term Storage C (170C) may be implemented using hardware, software, or any combination thereof.

In one or more embodiments, Long-Term Storage A (170A) and Long-Term Storage B (170B) may provide less, the same, or more functionalities and/or services (e.g., SS A (164A) may locally read/write data and/or metadata from/to Long-Term Storage A (170A), SS B (164B) may locally read/write data and/or metadata from/to Long-Term Storage B (170B), Long-Term Storage A (170A) may replicate data/metadata from itself to Long-Term Storage C (170C) (e.g., local data/metadata may be replicated to another zone, as needed), Long-Term Storage B (170B) may replicate data/metadata from itself to Long-Term Storage C (170C), etc.) comparing to Long-Term Storage C (170C).

One of ordinary skill will appreciate that Long-Term Storage A (170A) and Long-Term Storage B (170B) may perform other functionalities without departing from the scope of the invention. Long-Term Storage A (170A) and Long-Term Storage B (170B) may be implemented using hardware, software, or any combination thereof.

Turning now to FIG. 2.1, FIG. 2.1 shows multiple configuration templates in accordance with one or more embodiments of the invention. A configuration template may be used to define, for example, SCs in a given SS.

In one or more embodiments, Consensus Service A (e.g., 168A, FIG. 1.2) may keep the configuration template related to Edge Node A (e.g., 120A, FIG. 1.1), in which this configuration template may specify (or include), for example (but not limited to): location and distribution information of SCs to the their related SSs across Pravega deployments (e.g., "system.containers: EdgeNodeA: [A-B], EdgeNodeB: [C-D], and Cloud: [E-H]"); zone information of the corresponding Pravega deployment (e.g., "system.zone: EdgeNodeA"); SS information of the corresponding Pravega deployment in Zone A (e.g., "number of SS instances: 1", "memory capacity: 2 GB", and "CPU count: 2"); controller information of the corresponding Pravega deployment in Zone A (e.g., "number of controller instances: 1", "memory capacity: 1 GB", and "CPU count: 1"); one or more rules/policies that are provided based on (i) a profile of a user, (ii) an identifier of Edge Device A (e.g., 110A, FIG. 1.1), (iii) a type of a network connection, (iv) a type of Edge Device A, (v) a type of Edge Node A, and (vi) contents/payloads of network traffic; etc.

In one or more embodiments, based on the zone-aware SC distribution framework, Edge Node A (e.g., 120A, FIG. 1.1) may become aware of Zone A-Zone C and each SC that exists in each zone via the configuration template associated with it. Further, depending on the computing resources available in Zone A, SS and controller related parameters of the configuration template (related to Edge Node A) may be independently customized.

In one or more embodiments, Consensus Service B (e.g., 168B, FIG. 1.2) may keep the configuration template related to Edge Node B (e.g., 120B, FIG. 1.1), in which this configuration template may specify (or include), for example (but not limited to): location and distribution information of SCs to the their related SSs across Pravega deployments (e.g., "system.containers: EdgeNodeA: [A-B], EdgeNodeB: [C-D], and Cloud: [E-H]"); zone information of the corresponding Pravega deployment (e.g., "system.zone: EdgeNodeB"); SS information of the corresponding Pravega deployment in Zone B (e.g., "number of SS instances: 1", "memory capacity: 2 GB", and "CPU count: 2"); controller information of the corresponding Pravega deployment in Zone B (e.g., "number of controller instances: 1", "memory capacity: 1 GB", and "CPU count: 1"); one or more rules/policies that are provided based on (i) a profile of a user, (ii) an identifier of Edge Device B (e.g., 110B, FIG. 1.1), (iii) a type of a network connection, (iv) a type of Edge Device B, (v) a type of Edge Node B, and (vi) contents/payloads of network traffic; etc.

In one or more embodiments, based on the zone-aware SC distribution framework, Edge Node B (e.g., 120B, FIG. 1.1) may become aware of Zone A-Zone C and each SC that exists in each zone via the configuration template associated with it. Further, depending on the computing resources available in Zone B, SS and controller related parameters of the configuration template (related to Edge Node B) may be independently customized.

In one or more embodiments, Consensus Service C (e.g., 168C, FIG. 1.2) may keep the configuration template related to the cloud (e.g., 130, FIG. 1.1), in which this configuration template may specify (or include), for example (but not limited to): location and distribution information of SCs to the their related SSs across Pravega deployments (e.g., "system.containers: EdgeNodeA: [A-B], EdgeNodeB: [C-D], and Cloud: [E-H]+ (read-only: [A\*-D\*])"); zone information of the corresponding Pravega deployment (e.g., "system.zone: Cloud"); SS information of the corresponding Pravega deployment in Zone C (e.g., "number of SS instances: 1", "memory capacity: 8 GB", and "CPU count: 4"); controller information of the corresponding Pravega deployment in Zone C (e.g., "number of controller instances: 1", "memory capacity: 8 GB", and "CPU count: 4"); one or more rules/policies that are provided based on (i) a profile of a user, (ii) a type of a network connection, and (iii) contents/payloads of network traffic; etc.

In one or more embodiments, based on the zone-aware SC distribution framework, the cloud (e.g., 130, FIG. 1.1) may become aware of Zone A-Zone C and each SC that exists in each zone via the configuration template associated with it. Further, depending on the computing resources available in Zone C, SS and controller related parameters of the configuration template (related to the cloud) may be independently customized.

In the configuration templates described above, "read-only: [A\*-D\*]" is demonstrated as part of the configuration template related to the cloud (e.g., 130, FIG. 1.1); however, embodiments herein are not limited as such. In one or more embodiments, to satisfy the consistency (with respect to SC deployment information) among configuration templates, "read-only: [A\*-D\*]" may also be included in the configuration templates related to Edge Node A (e.g., 120A, FIG. 1.1) and Edge Node B (e.g., 120B, FIG. 1.1).

As indicated, the first four-five lines of each configuration template are shared across different Pravega deployments (via corresponding consensus services of these deployments) in order to have consistent SC deployment information across the heterogeneous environment. For example, when a new "edge node" zone (e.g., Zone D) is deployed to the heterogeneous environment, location and distribution information of SCs to their related SSs in Zone D may be shared/propagated across the consensus services to have consistent SC deployment information. In one or more embodiments, information shown in the rest of each configuration template may not be shared with other consensus services in the environment.

Turning now to FIG. 2.2, FIG. 2.2 shows a mapping of scopes to zones to locate the correct SCs to read data in accordance with one or more embodiments of the invention. In one or more embodiment, a stream identifier may be organized within a scope. As used herein, a "scope" may be a string and may convey information to a user/administrator for the corresponding stream (e.g., "FactoryMachines"). A scope may act as a namespace for stream identifiers (e.g., as folders do for files) and stream identifiers may be unique within a scope.

Further, a stream may be uniquely identified by a combination of its stream identifier and scope. In one or more embodiments, a scope may be used to separate identifiers by tenants (in a multi-tenant environment), by a department of an organization, by a geographic location, and/or any other categorization a user selects.

Referring to FIG. 1.2, read-only SCs (e.g., SC A* (230A*), SC B* (230B*), SC C* (230C*), SC D* (230D*), etc.) may update their metadata periodically to reflect the most recent state of data available in Long-Term Storage C (e.g., 170C, FIG. 1.2) and they may be used to serve batch analytics/reads. As a reader component (of, for example, Edge Device C (210C) and/or a cloud application) may read data from different zones in a heterogeneous environment via the read-only SCs, a mechanism/mapping provided by the corresponding consensus service (Consensus Service C (220C)) supports Controller C (215C) to infer from what zones the streams are received (e.g., to infer the zone to which a particular stream belongs to).

As indicated in FIG. 2.2, a mapping that relates scopes and zones is provided by Consensus Service C (220C) to locate the correct SCs to read data, therefore enabling a reader component to read streams from other zones transparently (e.g., indicating that scopes are unique across zones). For example, (i) Consensus Service C may specify "scope1: Edge Node A" and "scope2: Edge Node B", in which Edge Node B represents Zone B; (ii) with the help of Consensus Service C, Controller C (215C) may infer segment "scope1/stream 1/segmentA" is in SC A* (which currently executes in SS C (225C)); and (iii) based on that, a reader component of Edge Device C (210C) may perform a reading operation following "scope1/stream 1/segmentA".

Turning now to FIG. 3, FIG. 3 shows how the zone-aware SC distribution framework may be extended with new SCs deployed on new zones in accordance with one or more embodiments of the invention. Assume here that, for example, at a first point-in-time (at time1), (i) Pravega deployed to Edge Node A (302A) (representing Zone A) includes SS A (305A), which hosts "active" SC A (306A) and SC B (306B); (ii) Pravega deployed to Edge Node B (302B) (representing Zone B) includes SS B (305B), which hosts "active" SC C (306C) and SC D (306D); and (iii) Pravega deployed to the cloud (310) (representing Zone C) includes SS C (305C), which hosts (a) "active" SC E (306E) and SC F (306F), and (b) "read-only" SC A* (306A*) and SC B* (306B*), and further includes SS D (305D), which hosts (a) "active" SC G (306G) and SC H (306H), and (b) "read-only" SC C* (306C*) and SC D* (306D*).

At a later point-in-time (at time2), a new zone with new SCs may be added (for example, based on a request received from a user) to the heterogeneous environment without affecting the distribution of existing SCs in other zones (such that the environment may be extended with the help of the zone-aware SC distribution framework). Continuing with the above example, assume here that Edge Node C (302C) (representing Zone C) is deployed to the environment, in which Edge Node C includes SS C (305C) that hosts "active" SC I (306I) and SC J (306J). Further, a read-only version of each newly added SCs may also deployed to the cloud (310) for data processing purposes, in which "read-only" SC I* (306I*) is deployed to SS C (305C) and "read-only" SC J* (306J*) is deployed to SS D (305D). Referring to FIG. 2.2, these read-only SCs may be independently configured (such that they may be removed at a later point-in-time with no risk of damaging any data).

In one or more embodiments, the above pattern may be extended (over time) towards generating a mesh of Pravega deployments that ingests data and perform real-time read/write operations, while the same data is moved to the cloud (310) for further data processing purposes.

FIG. 4 shows a method for managing stream data in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4, the method shown in FIG. 4 may be executed by, for example, the above-discussed Edge Device A (e.g., 110A, FIG. 1.2), SS A (e.g., 164A, FIG. 1.2), Logger A (e.g., 166A, FIG. 1.2), and Long-Term Storage (e.g., 170C, FIG. 1.2). Other components of the system (100) illustrated in FIG. 1.2 may also execute all or part of the method shown in FIG. 4 without departing from the scope of the invention.

In Step 400, SS A receives a request from a requesting entity (e.g., a user/customer of Edge Device A, an administrator terminal, a first user that initiated a data write request, etc.) from a first edge device (e.g., Edge Device A) executing in a first zone (e.g., Zone A (e.g., 121A, FIG. 1.2)), in which the request may include stream data.

In one or more embodiments, before sending the write request to SS A, a writer component of Edge Device A may first communicate with Controller A (e.g., 162A, FIG. 1.2) of Zone A to infer which SS it supposed to connect to. Based on that, the writer component may connect to SS A to start appending data.

In Step 402, in response to receiving the request, as part of that request, and/or in any other manner, SS A transmits/writes (synchronously) the stream data to a tier-1 storage (e.g., Logger A) of the first zone. To this end and with the help of the "zone-aware SC distribution framework", the first zone may allow the first user to ingest data and execute real-time analytics/processing on that data (while guaranteeing data consistency, durability, and instant access to recent stream data).

In Step 404, once the aforementioned write operation is acknowledged and in an offline process, SS A may group the stream data (written to the tier-1 storage) into larger chunks (by employing a set of linear, non-linear, and/or ML models) and moves/stores (asynchronously) the chunks to a tier-2 storage (e.g., 170C, FIG. 1.2) of a second zone (e.g., Zone C (e.g., 121C, FIG. 1.2)) while exploiting storage tiering capabilities (e.g., active-passive data replication, high read/write throughput, etc.) of the corresponding streaming storage system.

To this end, for example, a second user (of Zone C) may have access to data written at "active" SC A (e.g., 165A, FIG. 1.2) of SS A via "read-only" SC A* (e.g., 165A*, FIG. 1.2) (of Zone C) to perform large-scale batch analytics in Zone C (with more resources), in which read-only SC A* may read/retrieve the corresponding data from the tier-2 storage (without retrieving the data from SC A and without suffering from latency). In one or more embodiments, the method may end following Step 404.

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing stream data, the method comprising:
   receiving, from a first edge device (ED) executing in a first zone, a first user-initiated data write request comprising stream data,
      wherein the stream data is partitioned into at least one segment, wherein an event included in the stream data is written into the at least one segment based on an event's routing key, wherein a first segment container (SC) of a first segment store (SS) hosts the at least one segment,
      wherein the first user operates in the first zone;
   transmitting the stream data to a tier-1 storage of the first zone in order to provide a low-latency access to the stream data for the first user;
   moving the stream data to a tier-2 storage of a second zone for permanent storage of the stream data,
      wherein the second zone comprises a read-only version of the first SC,
      wherein, using the read-only version of the first SC, a second user operating in the second zone accesses the stream data received by the first SS, and
      wherein, when requested by the second user, the read-only version of the first SC retrieves the stream data from the tier-2 storage.

2. The method of claim 1,
   wherein the stream data is a continuous, unbounded, append-only, and durable sequence of bytes,
   wherein the event is a group of bytes comprising a measurement performed in the first ED, and
   wherein the event's routing key is a universally unique identifier that allows the first SS to determine related events included in the stream data.

3. The method of claim 1,
   wherein a first streaming storage system (SSS) executing on the first zone comprises the first SS, the first SC, the tier-1 storage, and a first consensus service, wherein the first SS hosts the first SC,
   wherein a second SSS executing on the second zone comprises a second SS, a second SC, the read-only version of the first SC, and a second consensus service, wherein the second SS hosts the second SS and the read-only version of the first SC, and wherein the tier-2 storage executes outside of the second SSS, and
   wherein, based on a zone-aware SC distribution framework across a heterogeneous environment, the first SS only manages the first SC and the second SS only manages the second SC and the read-only version of the first SC.

4. The method of claim 3,
   wherein the heterogeneous environment comprises at least the first zone, the second zone, and a third zone, wherein the second zone is a cloud environment, and wherein the first zone, the second zone, and the third zone are distinct zones,
   wherein, based on the zone-aware SC distribution framework, a first edge node (EN) executing in the first zone becomes aware of the first zone, the second zone, the third zone, and each SC that exists in each zone via a first configuration template (CT) associated with the first EN,
   wherein, based on the zone-aware SC distribution framework, a second EN executing in the second zone becomes aware of first zone, the second zone, the third zone, and each SC that exists in each zone via a second CT associated with the second EN,
   wherein the first SSS is deployed to the first EN, and
   wherein the second SSS is deployed to the second EN.

5. The method of claim 4, wherein the first SSS implements an exactly-once semantics process to durably store the stream data without suffering from a possibility of data duplication and storage overhead on a reconnection after a first SSS failure.

6. The method of claim 4,
   wherein the first consensus service is operably connected to the second consensus service over the network to communicate with the second consensus service to keep the first CT consistent with the second CT in the heterogeneous environment, and
   wherein the first SS and the third SS are operably connected to the tier-2 storage over the network to permanently store a plurality of stream data in the tier-2 storage.

7. The method of claim 6, wherein, in order to keep the first CT consistent with the second CT, the first consensus service only shares location and distribution information of the first SC with the second consensus service.

8. The method of claim 7, wherein the first CT specifies at least one selected from a group consisting of location and distribution information of each SC across the heterogeneous environment, a resource related parameter (RRP) for a resource assigned to the first SS, a second RRP for a second resource assigned to a controller of the first SSS, a profile of the first user, and a type of the network.

9. The method of claim 8, wherein the resource is a central processing unit (CPU), a graphics processing unit (GPU), a data processing unit (DPU), memory, or a network resource.

10. The method of claim 8, wherein the RRP specifies at least one selected from a group consisting of a virtual central processing unit (vCPU) count per SS, a speed select technology configuration, and an SS input/output memory management unit configuration.

11. The method of claim 8, wherein the RRP specifies at least one selected from a group consisting of a virtual network interface card (vNIC) count per SS, a wake on local area network (LAN) support configuration, a swap space configuration per SS, a reserved memory configuration, and a memory ballooning configuration.

12. The method of claim 8, wherein the second RRP specifies at least one selected from a group consisting of a virtual graphics processing unit (vGPU) count per controller, a type of a vGPU scheduling policy, a type of a GPU virtualization approach that needs to be implemented, a virtual central processing unit (vCPU) count per controller, a speed select technology configuration, a controller input/output memory management unit configuration, and a virtual network interface card (vNIC) count per controller.

13. The method of claim 1, wherein the first zone is a first geographic region in the world, wherein the second zone is a second geographic region in the world.

14. The method of claim 1,
wherein the tier-1 storage is a distributed write-ahead log providing short-term, durable, and low-latency data protection of the stream data, and
wherein the tier-2 storage is a pluggable object storage providing long-term and durable data protection of the stream data.

15. A non-transitory computer-readable medium comprising computer-readable program code, which when executed by a computer processor enables the computer processor to perform a method for managing stream data, the method comprising:
receiving, from a first edge device (ED) executing in a first zone, a first user-initiated data write request comprising stream data,
wherein the stream data is partitioned into at least one segment, wherein an event included in the stream data is written into the at least one segment based on an event's routing key, wherein a first segment container (SC) of a first segment store (SS) hosts the at least one segment,
wherein the first user operates in the first zone;
transmitting the stream data to a tier-1 storage of the first zone in order to provide a low-latency access to the stream data for the first user;
moving the stream data to a tier-2 storage of a second zone for permanent storage of the stream data,
wherein the second zone comprises a read-only version of the first SC,
wherein, using the read-only version of the first SC, a second user operating in the second zone accesses the stream data received by the first SS, and
wherein, when requested by the second user, the read-only version of the first SC retrieves the stream data from the tier-2 storage.

16. The non-transitory computer-readable medium of claim 15,
wherein the stream data is a continuous, unbounded, append-only, and durable sequence of bytes,
wherein the event is a group of bytes comprising a measurement performed in the first ED, and
wherein the event's routing key is a universally unique identifier that allows the first SS to determine related events included in the stream data.

17. The non-transitory computer-readable medium of claim 15,
wherein a first streaming storage system (SSS) executing on the first zone comprises the first SS, the first SC, the tier-1 storage, and a first consensus service, wherein the first SS hosts the first SC,
wherein a second SSS executing on the second zone comprises a second SS, a second SC, the read-only version of the first SC, and a second consensus service, wherein the second SS hosts the second SS and the read-only version of the first SC, and wherein the tier-2 storage executes outside of the second SSS, and
wherein, based on a zone-aware SC distribution framework across a heterogeneous environment, the first SS only manages the first SC and the second SS only manages the second SC and the read-only version of the first SC.

18. The non-transitory computer-readable medium of claim 17,
wherein the heterogeneous environment comprises at least the first zone, the second zone, and a third zone, wherein the second zone is a cloud environment, and wherein the first zone, the second zone, and the third zone are distinct zones,
wherein, based on the zone-aware SC distribution framework, a first edge node (EN) executing in the first zone becomes aware of the first zone, the second zone, the third zone, and each SC that exists in each zone via a first configuration template (CT) associated with the first EN,
wherein, based on the zone-aware SC distribution framework, a second EN executing in the second zone becomes aware of first zone, the second zone, the third zone, and each SC that exists in each zone via a second CT associated with the second EN,
wherein the first SSS is deployed to the first EN, and
wherein the second SSS is deployed to the second EN.

19. A system for managing stream data, the system comprising:
a processor comprising circuitry;
memory comprising instructions, which when executed perform a method, the method comprising:
receiving, from a first edge device (ED) executing in a first zone, a first user-initiated data write request comprising stream data,
wherein the stream data is partitioned into at least one segment, wherein an event included in the stream data is written into the at least one segment based on an event's routing key, wherein a first segment container (SC) of a first segment store (SS) hosts the at least one segment,
wherein the first user operates in the first zone;
transmitting the stream data to a tier-1 storage of the first zone in order to provide a low-latency access to the stream data for the first user;
moving the stream data to a tier-2 storage of a second zone for permanent storage of the stream data,
wherein the second zone comprises a read-only version of the first SC,
wherein, using the read-only version of the first SC, a second user operating in the second zone accesses the stream data received by the first SS, and
wherein, when requested by the second user, the read-only version of the first SC retrieves the stream data from the tier-2 storage.

20. The system of claim 19,
wherein the stream data is a continuous, unbounded, append-only, and durable sequence of bytes,
wherein the event is a group of bytes comprising a temperature reading from the first ED, and
wherein the event's routing key is a universally unique identifier that allows the first SS to determine related events included in the stream data.

* * * * *